United States Patent
Slapp, III

(10) Patent No.: US 10,749,658 B2
(45) Date of Patent: *Aug. 18, 2020

(54) VIRTUAL CLASSROOM MANAGEMENT DELIVERY SYSTEM AND METHOD

(71) Applicant: E&C HOLDING COMPANY, LLC, Woodland Hills, CA (US)

(72) Inventor: Robert J. Slapp, III, Temecula, CA (US)

(73) Assignee: E&C HOLDING COMPANY, LLC, Woodland Hills, CA (US)

(*) Notice: Subject to any disclaimer, the term of this patent is extended or adjusted under 35 U.S.C. 154(b) by 20 days.

This patent is subject to a terminal disclaimer.

(21) Appl. No.: 16/252,897

(22) Filed: Jan. 21, 2019

(65) Prior Publication Data

US 2019/0165918 A1     May 30, 2019

Related U.S. Application Data

(63) Continuation of application No. 15/640,343, filed on Jun. 30, 2017, now Pat. No. 10,187,192, which is a (Continued)

(51) Int. Cl.
| | | |
|---|---|---|
| *H04L 5/00* | (2006.01) | |
| *G09B 7/00* | (2006.01) | |
| *H04L 29/08* | (2006.01) | |

(52) U.S. Cl.
CPC .............. *H04L 5/0078* (2013.01); *G09B 7/00* (2013.01); *H04L 67/12* (2013.01)

(58) Field of Classification Search
CPC .......... H04L 5/0078; H04L 67/12; G09B 7/00
See application file for complete search history.

(56) References Cited

U.S. PATENT DOCUMENTS 5,819,047 A * 10/1998 Bauer .................. G06F 9/5011
                                                      709/229
7,698,360 B2    4/2010   Rowley et al.
(Continued)

FOREIGN PATENT DOCUMENTS

| WO | WO0191086 A1 | 11/2001 |
| WO | WO2004029805 A2 | 4/2004 |
| WO | WO2004059421 A2 | 7/2004 |

OTHER PUBLICATIONS

Citrix, "GoToTraining—Online Training Software—Citrix," Website. http://www.citrix.com/products/gototraining/overview.html.
(Continued)

*Primary Examiner* — Anil K Bhargava
(74) *Attorney, Agent, or Firm* — David L. Hoffman; Hoffman Patent Group

(57) ABSTRACT

In an embodiment, a computer implemented method of an online course, includes receiving a server quantity via a browser interface, the server quantity being the number of servers to be loaded with an operating system and a course application to provide a computer-based teaching environment to a student user, wherein the browser interface operates within a database. The method further includes receiving a server-student allocation via the browser interface, the server-student allocation being a number that determines the proportion of students in the computer-based teaching environment to the servers providing the computer-based teaching environment. The method also includes determining a reservation permission for the computer-based teaching environment during a timeslot based on the server quantity, the server-student allocation, and available assets, wherein the available assets includes an unreserved server, and
(Continued)

providing, via the browser interface, the reservation permission for the computer-based teaching environment during the timeslot.

20 Claims, 18 Drawing Sheets

Related U.S. Application Data continuation of application No. 14/397,192, filed as application No. PCT/US2013/043791 on May 31, 2013, now Pat. No. 9,716,580.

(60) Provisional application No. 61/829,217, filed on May 30, 2013, provisional application No. 61/829,212, filed on May 30, 2013, provisional application No. 61/829,223, filed on May 30, 2013, provisional application No. 61/653,659, filed on May 31, 2012.

(56) References Cited

U.S. PATENT DOCUMENTS

| | | | |
|---|---|---|---|
| 8,321,255 B1 | 11/2012 | Brearley et al. | |
| 8,417,801 B2 | 4/2013 | Dalal | |
| 8,429,082 B1 | 4/2013 | Biswas et al. | |
| 9,716,580 B2 | 7/2017 | Slapp | |
| 10,187,192 B2 | 1/2019 | Slapp | |
| 2002/0083111 A1* | 6/2002 | Row | H04L 29/06 718/1 |
| 2002/0174041 A1* | 11/2002 | Grey | G06Q 20/145 705/32 |
| 2003/0014478 A1* | 1/2003 | Noble | G06F 9/5083 709/203 |
| 2004/0121299 A1 | 6/2004 | Rougeau | |
| 2006/0031083 A1 | 2/2006 | Dalal et al. | |
| 2006/0046239 A1 | 3/2006 | Allen et al. | |
| 2006/0241998 A1 | 10/2006 | Rokosz et al. | |
| 2007/0196808 A1 | 8/2007 | Call | |
| 2008/0050715 A1 | 2/2008 | Golczewski et al. | |
| 2009/0234878 A1* | 9/2009 | Herz | G06Q 20/383 |
| 2011/0177484 A1 | 7/2011 | Morgan et al. | |
| 2011/0269111 A1 | 11/2011 | Elesseily et al. | |
| 2012/0059915 A1* | 3/2012 | Dalal | G06Q 10/10 709/220 |
| 2012/0182384 A1* | 7/2012 | Anderson | H04L 12/1827 348/14.09 |

OTHER PUBLICATIONS

International Search Report and Written Opinion, International Application No. PCT/US2013/043791, dated Oct. 31, 2013 (11 pages).

* cited by examiner

MANAGE SERVER GROUP 602

ASSET AVAILABLE COLUMN NAME [PLEASE SELECT ▶]

GROUP DESCRIPTION [       ]

GROUP AVAILABLE FROM [       ]

GROUP EXPIRATION DATE [       ]

ENABLED  ○ Y  ○ N

FIG. 6

ADD SERVER TO APPLICATION 802

| EDIT | GROUP | VIRTUAL SERVER? | VS TYPE | MFR | PROCESSOR # | MEMORY | OS | ASSET # | SERIAL # |
|------|-------|-----------------|---------|-----|-------------|--------|----|---------|----------|
|      |       |                 |         |     |             |        |    |         |          |
|      |       |                 |         |     |             |        |    |         |          |
|      |       |                 |         |     |             |        |    |         |          |
|      |       |                 |         |     |             |        |    |         |          |
|      |       |                 |         |     |             |        |    |         |          |

FIG. 8

MANAGE SERVER 902

PARENT SERVER [VM-HOST-1 ▽]

VIRTUAL SERVER? ○ Y ○ N

SERVER GROUP

HOST NAME

SERVER IN USE?

START/END DATE

PROCESSORS ◁▷

MEMORY (GB) ◁▷

NICS ◁▷

MANUFACTURER

CLASS RESERVATION ID

ASSET NUMBER

ENABLED? ○ Y ○ N

FIG. 9

MANAGE OPERATING SYSTEM 1002

OPERATING SYSTEM NAME

REVISION NUMBER

MEMORY (GB)

ASSET TRACKING Y N

RDP CONNECTION Y N

TELNET CONNECTION Y N

SSH CONNECTION Y N

VNC CONNECTION Y N

ASSET AVAILABLE NAME

FIG. 10

ADD LICENSE 1202

| | LICENSE NAME | LICENSE KEY | PURCHASE DATE | LICENSE COST |
|---|---|---|---|---|
| ☐ | VVCXVCXV | VCXVXC | 23 MAR 2011 | 4234 |
| ☐ | QUICKBOOKS | 1234567 | 01 FEB 2012 | 2000 |
| ☐ | MICROSOFT WORD | 1234 | 01 FEB 2012 | 2000 |

FIG. 12

ADD COURSE 1302

COURSE TYPE ○ CLASSROOM ○ PERFORMANCE BASED ○ SELF PACED

COMPANY

PARENT COURSE

COURSE NAME

COURSE DESCRIPTION

AVAILABLE DATES

COURSE DURATION (DAYS)

MIN/MAX DAY DURATION

DEFAULT START/FINISH TIME

MAXIMUM EXTEND TIME

DAILY SCHEDULE LIMIT

FIG. 13

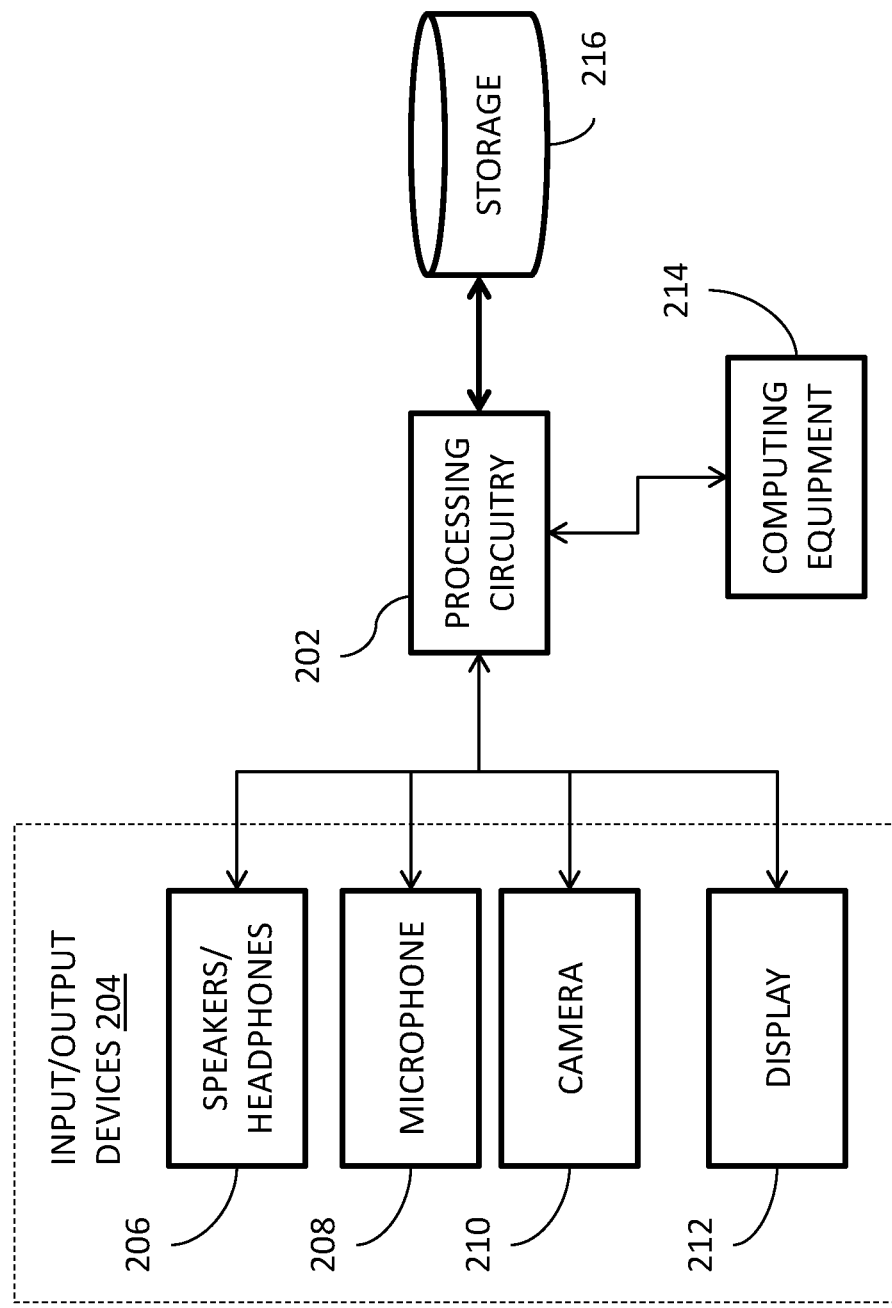

VIRTUAL CLASSROOM MANAGEMENT DELIVERY SYSTEM AND METHOD

CROSS REFERENCE TO RELATED APPLICATION(S)

This application is a continuation of and claims priority from U.S. patent application Ser. No. 15/640,343, filed Jun. 30, 2017, which is a continuation of and claims priority from U.S. patent application Ser. No. 14/397,192 filed Oct. 26, 2014, now U.S. Pat. No. 9,716,580, which is a U.S. national stage application of International Patent Application No. PCT/US2013/043791, having an international filing date of May 31, 2013, which designated the United States and which claims priority from each of U.S. Provisional Patent Application Ser. No. 61/653,659 filed May 31, 2012, U.S. Provisional Patent Application Ser. No. 61/829,217 filed May 30, 2013, U.S. Provisional Patent Application Ser. No. 61/829,212 filed May 30, 2013, and U.S. Provisional Patent Application Ser. No. 61/829,223 filed May 30, 2013, and which are each incorporated by reference herein.

BACKGROUND OF THE INVENTION

Field of the Invention

This invention relates to online courses, and in particular to a virtual classroom management delivery system and method.

Description of the Related Art

Conventional systems for providing online courses may allow corporations or universities to present courses online. These conventional systems may use computing resources inefficiently, such as by allowing systems to remain idle when they could be used to provide courses, by overcharging corporations and others for unused resources, and/or by being costly or otherwise difficult to set up. Such conventional systems may also unnecessarily consume power.

In addition, such systems are typically not browser-based, requiring users to download software to their computer workstations, which can create compatibility and other issues.

Java® is a programmer's obvious choice for web-based applications because Java® can run regardless of the computer architecture it is being used on. So, Java® is useful for programmers to deliver a Virtual Classroom for student users and/or professors/teachers who may all have different computers and different operating systems.

SUMMARY OF THE INVENTION

In a preferred embodiment, systems and methods for providing a virtual classroom management delivery system (VCMDS) permit students to access virtual classrooms, virtual labs, performance based testing, supporting materials (videos, slides), and documentation generated using one or more physical and/or virtual servers. The VCMDS also permits management of virtual classrooms, virtual labs, etc. Users access the VCMDS through a standard browser rather than through a GUI (proprietary software that must be downloaded and installed in addition to a standard browser). In the preferred embodiment, VCMDS also tracks usage of copyrighted material.

BRIEF DESCRIPTION OF THE DRAWINGS

FIG. 6 is an illustration of a user interface for managing a server group, according to the preferred embodiment of the invention;

FIG. 8 is an illustration of a user interface for adding a server to a group, according to the preferred embodiment of the invention;

FIG. 9 is an illustration of a user interface for managing a server, according to the preferred embodiment of the invention;

FIG. 10 is an illustration of a user interface for managing an operating system, according to the preferred embodiment of the invention;

FIG. 12 is an illustration of a user interface for adding a license, according to the preferred embodiment of the invention;

FIG. 13 is an illustration of a user interface for adding a course, according to the preferred embodiment of the invention;

FIG. 18 is an example of a computing system diagram, according to the preferred embodiment of the invention.

DESCRIPTION OF THE PREFERRED EMBODIMENT(S)

Figure 1:
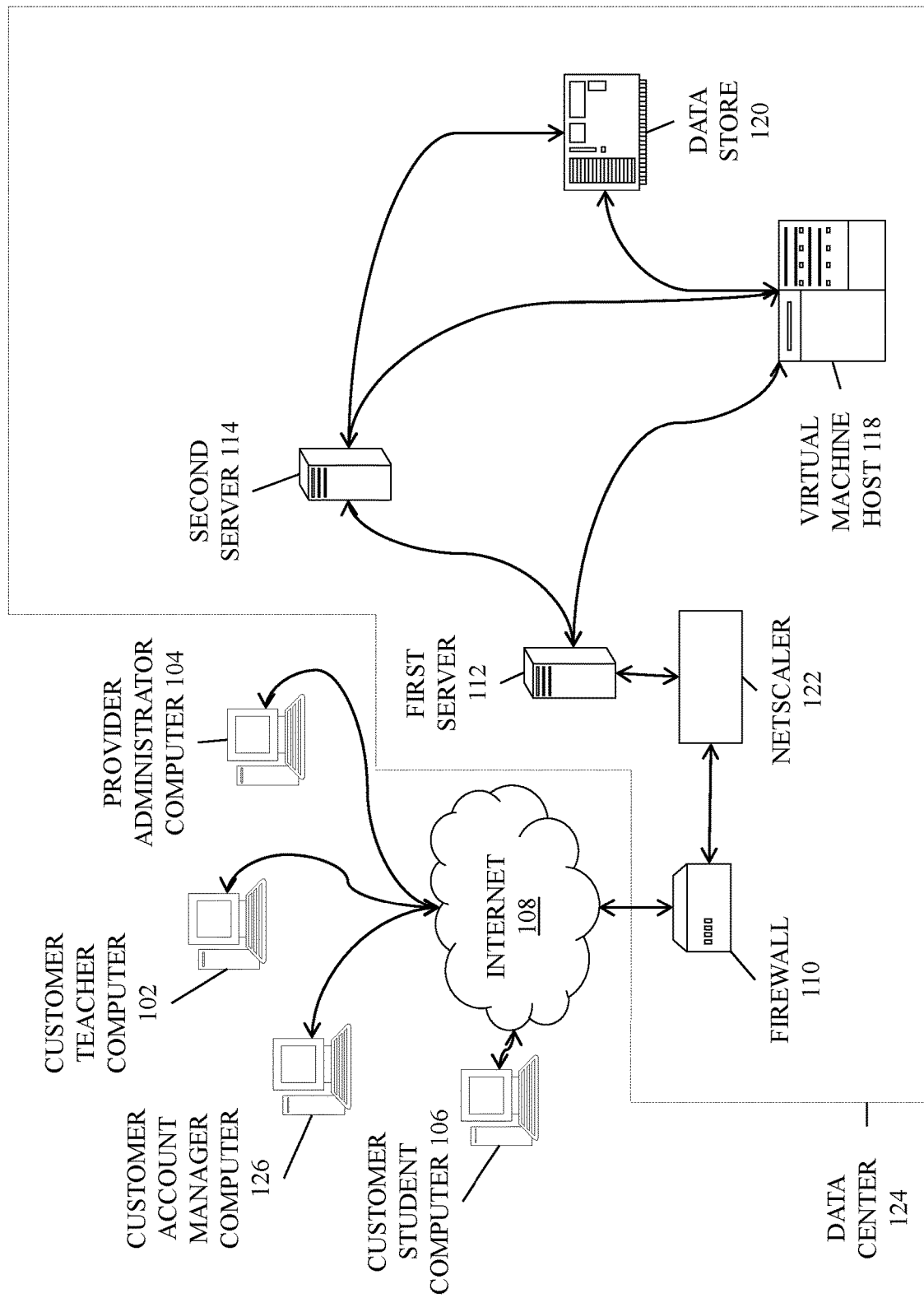
FIG. 1 is a schematic of a virtual classroom delivery system in accordance with the preferred embodiment of the invention.

The following detailed description is of the best currently contemplated modes of carrying out exemplary embodiments of the invention. The description is not to be taken in a limited sense, but is made merely for the purpose of illustrating the general principles of the invention.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

In the present invention, management of the system includes making reservations for time(s) to give (deliver) a class, lab session, and testing. Using a database (e.g., Oracle) programming language and information stored in the database's "shared memory," the VCMDS integrates management and delivery of a virtual class, a virtual lab, and testing.

User Types and User Interaction with VCMDS

The system is structured to allow access by four different types of users: administrators, account managers, instructors, and students. The administrator, who is employed by the VCMDS provider, sets up course parameters (e.g., allocate resources or assets) for customer course requests, company profiles, and services. Course parameters may include whether physical or virtual servers are used, server type, number of processors, amount of memory allocated, number of classroom seats, operating systems, applications, and licenses.

Account managers are customer representatives who control instructor and student rights, reservations, reports, upload users, download users, change course announcements, and messages. Account managers are employed by customers of the VCMDS provider. Once the administrator sets up the parameters, the account manager can then utilize the VCMDS independently for this specific course established. The account manager cannot upload a random new course without the assistance of the administrator.

Instructors teach courses that are managed by the VCMDS, and are considered customers of the VCMDS provider. Instructors are given rights within the VCMDS by the account manager to manage student transfers between courses, extensions, and student level. Instructors can only manage class reservations that are instructor-lead, not self-paced courses.

Students access learning environments using the VCMDS, and are considered customers of the VCMDS provider. An account manager creates a student profile. A student can make a reservation for a self-paced class and/or be assigned to a class by an instructor or account manager. Unlike administrators, account managers, and teachers, students can access a learning environment (e.g., a virtual classroom, lab, etc.). In order to access the learning environment, an instructor or account manager must use a separate student profile.

The administrator (e.g., an employee of the VCMDS provider) collects and/or inputs into the VCMDS all of the information (e.g., course parameters such as server type and quantity) needed by a course. Customers (e.g., account managers, teachers, or students) are then enabled to utilize the VCMDS via reservations.

When a user (e.g., an administrator, account manager, teacher, or student) logs in to the VCMDS, the VCMDS is configured to provide a dashboard view and corresponding security settings to the user based on the user's account type. For example, an administrator is given administrator level security access and provided with an administrator dashboard, and an account manager is given account manager level security access and provided with an account manager dashboard. Instructors and students likewise are provided with customized dashboard interfaces and security clearances.

Online Courses Provided and Managed Using the VCMDS

The VCMDS permits delivery and management of online courses, which include virtual classrooms, virtual labs, supporting class materials, and testing.

The virtual classroom is used to provide independent or teacher-lead instruction, and includes a common area (e.g., a chat window) to communicate with the instructor and other students while the instructor presents slides or demonstrates an assigned lab. The virtual classroom is assigned to a student using a reservation number, and accessed via a browser, not a GUI.

The virtual lab gives the student a system (e.g., a virtual or physical server) and applications to try out what he has learned according to the class objectives. The virtual lab is accessed via the browser, and multiple students may be assigned to a system. The virtual lab is assigned to the same reservation and included when the reservation is made.

If the student makes an error, or the student's system crashes or freezes, the VCMDS permits the student to click a "rebuild" button to return his server to a previous state, such as the state of the student's system and virtual lab at the beginning of that day's lab session. A student may have multiple servers assigned to his reservation for complex technical classes.

In some embodiments, "rebuild" may mean restoring a virtual server to a monitored state by restoring a disk image of the VCMDS. In other embodiments, the "rebuild" operation may in some embodiments perform the "build" operation for that student by selecting a server, installing the operating system, installing the applications being used, and restoring the work performed by the student to their condition at the beginning of that course session. Failed rebuilds may trigger reattempts to restore the student's server using additional backup servers.

Supporting class materials are assigned at the time a reservation is made, and are accessed via the browser interface. The supporting class materials may be free or copyrighted, and may include documentation, videos, diagram slides, testing materials. Free materials do not need tracking, but the VCDMS tracks usage of copyrighted material. The user typically confirms in advance the number of copyright licenses that were purchased from the owner, and the system tracks how many copyright licenses are remaining. When the maximum number of copyrighted materials have been allocated to students with reservations, no new reservations can be added because additional materials were not authorized.

Testing may be automated, and may include one or more of multiple choice testing, performance based testing, and problem testing. For example, a multiple choice test may include a master answer form that is automatically compared with the test answers of students, and the results for each student can be automatically emailed to the instructor for the course. Performance based testing occurs when a student is asked to demonstrate what he has learned using the virtual lab. The operations performed by the student and the ultimate results of the student's operations may be saved and provided to the instructor. The VCMDS may also implement problem testing. For example, the system may build servers with a known problem that the student should be able to repair. The student's performance may be recorded, timed, and relayed to the manager in an email.

Student User Experience

Students using the VCMDS may be working professionals, college students, or other types of students. Because the VCMDS provides access via standard browsers to software running on other machines, the students may access VCMDS provided courses using terminals, laptops, tablets, or other computing devices that may otherwise be incapable of running the software needed for a course. Students may therefore be given access to operating systems, software, and hardware that they would otherwise not be able to access because they used the wrong operating system, processor, memory, or other hardware limitation.

Student users may be registered by an instructor. In other embodiments, students can sign up and register themselves.

After being registered with the VCMDS, students can login and be presented with a browser interface that enables the students to view their course reservations, make new reservations, and access virtual classes, attend a virtual lab that allows them to learn to use software that may not be installed on the students' computing device, or participate in testing.

The student dashboard is presented through the browser interface which is created using a database programming language. The student dashboard includes four panels: future reservations, active reservations, self-paced courses offered, and course history. Future reservations shows active as well as scheduled reservations. Self paced courses offered shows courses that students can attend without an instructor present. Course history displays courses that students have already taken. In some embodiments, students are permitted to sign up for teacher-led courses via the student dashboard, such as through the future reservations panel or through a general courses offered panel.

To sign up for a course, students can select a course that is offered. If the course has already been scheduled to occur, the course may be added to the student's calendar of courses. The scheduled times for courses are converted into the student's active time zone.

If the course can be scheduled by the student, the system calculates availability for the course based on the course's asset requirements, including server type, operating system, processor, application(s), and corresponding operating system and application license requirements. Availability may be determined for a fixed window of time, such as a three month span of dates, and may be determined on an hourly basis.

Overview of VCMDS Operations

The VCMDS is an automated control environment that automatically builds and delivers online courses (e.g., virtual classrooms, virtual labs, class materials, performance based testing) via a browser interface to students. Administrators (e.g., employees of VCMDS providers) structure the online course based on available resources using the browser interface of the VCMDS. After the administrator sets up the course, the VCMDS allows customers (e.g., account managers, instructors, or students) to schedule courses based on requested course parameters and available resources. The requested course parameters include how many students are assigned to each physical and/or virtual server, course length, and course start and/or end times.

Based on the requested course parameters and available resources, the VCMDS provides a calendar view for available dates for the proposed course. Using the VCMDS, consecutive and non-consecutive dates may be selected for a course. The VCMDS also provides an indication of limited resources with respect to particular calendar dates, such as a limited number of additional seats, and/or servers.

The VCMDS may adjust pricing for the course based on the administrator's and/or the customer's selections with respect to selection of how many virtual and/or physical servers to allocate to the course. Availability for a course may further be limited by available funds for a course.

Based on the selected parameters, available resources, and/or course pricing and payment, prior to the scheduled start time for a course, the VCMDS automatically prepares the hardware and software needed to provide the VCMDS to be accessed by student users through browser interfaces.

A program system manager may be used to run all background processes and programs needed to automate data flow and to build database virtual infrastructure. The program system manager may use ORACLE scheduler or other suitable software as the application time clock to launch programs needed to create and update table information in accordance with data found in reservation tables.

By permitting customized access and pricing for online courses, labs, and testing via a browser interface, the VCMDS enables efficient coordination of shared resources to occur, creating opportunities for coordinated learning that would otherwise be too costly or difficult to manage. Customization for administrators, account managers, instructors, and students may occur with respect to scheduling, hardware, software, software licenses, and payment.

Scenarios for Course/Lab/Test Scheduling with Limited Assets

Assets may be limited by the total available resources controlled by the VCMDS provider, and by the number of assets that have been reserved by other users of the VCMDS system. In some embodiments, assets may further be limited by the number of assets that the VCMDS customer has available to it, such as if a customer has access to a limited number of classroom seats, software licenses, servers, etc. The customer may have limited access based on a limitation imposed by the VCMDS provider in accordance with a pricing plan.

In an example scenario of limited asset availability, a VCMDS customer may be an international company with employees distributed globally. The company may provide instructor led training (e.g., through courses, on a mechanical drafting program (e.g., Autocad) or other software to improve its employees' productivity. Employees who wish to participate may be too few and/or too far apart to justify a course in each time zone, or to pay for travel costs for employees to travel to a single course. However, by using VCMDS, sufficient employees may wish to participate to justify a single course taught by an instructor. By providing course software installed on VCMDS systems, the company may avoid the cost of purchasing expensive software that may not be used again before the next upgraded version is available, as well as purchasing and maintaining hardware that may not be needed in greater quantities. Instead, the company can purchase access to the needed software operating on the VCMDS provider's hardware on an as-needed basis.

The company may wish to provide the course to 50 different students, thus requiring access to 50 operating system licenses, and 50 application licenses (e.g., mechanical drafting program licenses). The VCMDS provider may have 100 of the correct server type, 100 operating system licenses, and 100 of the correct application licenses. During some calendar dates, other customers of the VCMDS provider may have reserved some of the same server type, operating system licenses, and/or application licenses.

During dates with no conflict, the user who is reserving the course (such as a teacher or student) is presented with a white calendar view of the calendar day in a weekly or monthly view.

During dates where there is overlapping use, but unallocated assets are sufficient for the course and the remaining assets are still above a threshold number, the user is still presented with a white calendar date. In an example scenario, out of the 100 total servers, 10 have been reserved for another course on a particular date, and 50 are needed for the course reservation. The 40 remaining unallocated servers may exceed a reserve threshold of 30 servers, so no further action is taken by the VCMDS.

During dates where there is overlapping use, but unallocated assets are sufficient for the course and the remaining assets are below a threshold number (e.g., 30), the user is presented with a yellow calendar date. In addition, a warning message may be sent to the VCMDS provider to indicate that more assets may be needed to meet customer demand. The warning message may be provided via email and/or by an indication on a provider calendar, indicating how many assets remain. In an example scenario, out of the 100 total servers, 30 have been reserved for another course on a particular date, and 50 are needed for the course reservation. The 20 remaining unallocated servers may fall below a reserve threshold of 30 servers, so the VCMDS sends a warning to the VCMDS provider.

During dates where there is overlapping use and unallocated assets are not sufficient for the course, the user is presented with a yellow calendar date if there is at least one time slot still available despite the conflict. The user is presented with a red calendar date if there are no time slots available that day. A warning may be provided to the VCMDS provider that assets are insufficient, such as by email and/or by a provider calendar update indicating needed assets. The user can click on the date to see availability broken down into hourly segments.

In some scenarios, the user may be provided with an indication of date availability if asset requirements are reduced, such as an indication that the date would be available for 35 students, but not 40. For example, the asset availability may be determined by a limitation of 35 available operating system licenses during that timeslot even if sufficient resources are available for all other assets.

Scenario for Scheduling Involving Multiple Timezones

An account manager or other user may be responsible for coordinating an international schedule of planned courses for a globally distributed company. Instructors, students, or and/or clients for the company in various time zones may ask the account manager to make adjustments to planned reservations for courses that they reserved. Using the VCMDS, the account manager may be provided with a calendar showing calendar availability for moving all or a part of a reservation to different times and/or dates.

The account manager may initially be provided with a calendar view based on the account manager's timezone. Because the reservation includes a record of the time zone in which the reservation was initially made, the VCMDS is able to identify a discrepancy between the reservation's time zone and the account manager's time zone. In response, the VCMDS prompts the account manager whether they would like to convert the displayed course schedule in the reservation's time zone instead of the account manager's time zone. If the account manager declines, nothing changes. If the account manager accepts, the reservation calendar view is shifted to the reservation maker's time zone. Calendar availability is then presented in terms of the initial reserving party's time zone.

In this way, the VCMDS enables the Account Manager to quickly and automatically make time zone adjustments through the course calendaring browser interface, avoiding the need for using third party software or external calendar conversion utilities. The Account Manager is thus enabled to make adjustments to the reservation for other internationally distributed persons based on the reserving party's needs with a reduced risk of human error based on time conversions.

Example Use and Operations of the Preferred Embodiment

1. Setting Up the VCMDS

If Server Groups have not been setup, the administrator uses the VCMDS to create a server group, which is a column in the asset table. As servers are added to this group, the VCMDS automatically increments the number in that column.

The administrator uses the VCMDS to add servers to the server group with a hostname and IP-Address. The administrator selects a type while adding a server to the group. Server types should not be mixed in the groups, because it may cause confusion. Four types that are supported are VMware servers, Hyper-V servers, KVM servers, and standalone servers, which are the main delivery methods. Using VMware may improve cost and efficiency. The administrator uses the VCMDS to add the selected servers to the server tables.

Next, the administrator uses the VCMDS to select the operating systems that are supported by the selected server types. For example, a VMware server can support Microsoft windows, Linux, UNIX and Mac windows using cold fusion. These are added to the operating tables with the license numbers for each one.

The administrator then uses VCMDS to select what applications that are supported on the above operating systems, and to add the selected applications to the application tables with the corresponding license numbers.

The administrator then uses VCMDS to set the number of Virtual Classrooms seats.

2. User Setup

The administrator provides the VCMDS with company information, and account manager information associated with each company. The account manager provides the VCMDS with instructor information. Each instructor is associated with an account manager. The VCMDS receives student information from the instructor or account manager.

3. Course Setup

The VCMDS receives operating system selections and application selections from the administrator. Although some more commonly used operating systems or applications may be selected, the VCMDS may provide options to install applications for an online course if a company using the course agrees to pay an additional fee.

The VCMDS receives a course and course number from the administrator. The course and course number are defined by the customer with a description. If the course is in a category, the VCMDS may receive a category assignment for the course from the administrator.

The VCMDS receives course defaults from a user. The course defaults include number of days, start times, end times, minimum time allowed for a reservation, and extension limits for the course in 1 hour increments up to a maximum of 3 hours.

The VCMDS enables a user to define a class as instructor lead training, self-paced, and/or performance test. The class definition determines the location where the course appears on each user type's dashboard.

The administrator uses the VCMDS to take all the course requirements from the company and to select the server group that this course will use. The administrator also selects the operating system, applications, and build script name.

The VCMDS also enables users to download any workbooks, videos, slides, tests that are needed for the course. If the materials need tracking for copyrights, the number of available licenses can be made an asset that is associated with the document. If the number of available licenses drops to 30 or less, the VCMDS notifies an administrator and account manager by email.

The VCMDS enables an administrator to set up a staging server so a Subject Matter Expert (SME) can look over the setup of the server's operating system and applications.

If the SME approves, then the administrator uses the VMCDS to take a snapshot or build a template that will be named after the course and saved on the data store.

The administrator then tries a test build using the VCMDS. If all is successful, the administrator uses the VCMDS to assign the course to the company, enabling the company's users to make reservations for the course.

4. Course Scheduling

Scheduling is performed using an algorithm implemented in PLSQL that breaks a day into 24 hours. The VCMDS scans the reservations table every 3 minutes to determine the currently scheduled reservations. If a reservation is booked, the corresponding date and times are filled with a reservation entry. When a time slot is open and has not been filled with a reservation entry, the status for that time slot is open.

Operations for Making a Reservation Include:

In response to a user click on a calendar icon or on a reservation screen, the VCMDS presents the user with an option to select a course. Each course presented to the user should be related to the company or client associated with the user.

The VCMDS provides the user with a calendar showing availability for making a course reservation. Different colors, such as white, yellow, and red are used to indicate availability of resources for the course.

White indicates that there are sufficient resources for the reservation on that date. Yellow indicates that there is a conflict, but there is at least partial availability for a course during that day (or other timeslot). Red indicates that the date is completely unavailable.

The VCMDS may use one or more of several equations to determine whether the requested assets exceed the available assets. These equations may include the following:

Number of servers per reservation×number of reservations=Number of total servers.

Number of students/the number of students per server=number of reservations

Number of Virtual Seats×the number of students=the number of virtual seats

Number of Operating Systems×Number of total servers=total number of operating systems Number of applications per server×Number of total servers=Number of applications Number of documents×the number of students=total documents required.

The user fills in the days and the start time and finish time of each day. The days selected for the course can be non-consecutive. The course may have a minimum and maximum number of hours that were defined by the account manager at the time of course release.

After all the fields are filled in, the user clicks "make reservation," which causes the VCMDS to record a reservation in the time slot.

5. Calendar and Asset Management Using the VCMDS

The calendar is a dynamic real time view that is automatically kept accurate and up to date by the system. Colors are used as a universal language to indicate the state of different days on the calendar.

The assets that make up a course are contained in an assets table in the database. Each asset has two columns: total available and total reserved. The calendar keeps track of asset availability and use on an hourly basis. The length of the record is determined by how many data entries are provided for the system, and may extend for as many months or years as required.

The VCMDS creates a month long view of the table, putting all assets in the same row, but different columns. This permits a real time search of assets that may be much faster than a row-by-row search of a database. During course creation, assets for the course are defined. Assets include: Number of servers, server group, operating system, operating system and number of licenses, applications and number of licenses, number of virtual class seats, associated materials, and number of copyright licenses. Assets are included in asset tables, but copyrighted materials are in a course table. Operating systems and applications may be used across server groups, and sufficient licenses should be kept to cover all server groups.

If a reservation is canceled, all assets are rolled back, and the company's purchased course units that were reserved are reaccredited.

The VCMDS displays a month, week, or day calendar view to the user who wishes to make a reservation. The calendar shows any reservations that were already made by their client. When the user selects a course, the VCMDS determines the availability for the course based on available assets, and updates the appearance of the calendar to show availability using different colors. If the user changes the number of servers to be used for the course and/or the number of students allocated to each server, the calendar updates the availability of the course and updates the colors of the calendar accordingly.

The VCMDS may limit the user to a period of three months in which they are able to make reservations, and additional fees may be required in order for the user to have a longer time frame in which to schedule courses. Longer time frames are useful for being able to schedule your class with very little contention for assets.

If a calendar day is completely available, the day is displayed in white. If a calendar day is not completely available, such as when one or more hours have already been reserved or are otherwise unavailable, the VCMDS displays that calendar day in yellow. Clicking on the calendar date causes the VCMDS to provide an image of that day broken down by hour with unavailable time slots blocked out. If a calendar day is completely unavailable, the day is displayed in red. In addition to highlighting the date in yellow or red, the VCMDS sends an email or other communication to an administrator to indicate that additional assets may be desired. The email includes the course and the limiting factor, which allows the administrator to add assets if necessary.

If the reservation for a course is accepted, the VCMDS permits the user to assign students to the class. The VCMDS enables the user to assign students from the calendar screen or to edit the reservation at a later time. If a reservation is being edited by a user in a different time from the person who originally made the reservation, the VCMDS notifies the user of the difference, and provides them with a one-click option to convert their time-zone view to the original reserving person's time-zone. In this way, a user managing reservations for multiple persons in different time zones is enabled to quickly adjust calendars regardless of the location of the original user.

6. Building and Delivering a Course

After courses have been set up, a user will be able to make a reservation. Instructors can make reservations for instructor-led courses, and can assign students to the reservations. Students are able to make reservations for self-paced courses. Once a course reservation has been made, courses are automatically built by the VCMDS in accordance with the schedule.

VCMDS checks the reservation build table at three minute intervals for any upcoming courses. We interrupt the start time, but integrate the region/time zone when the reservation was made.

Based on the scheduled start time for a course, a selection program of the VCMDS selects one or more servers from the correct group. The VCMDS chooses the server that has not been used for the greatest amount of time.

The selection program of the VCMDS then selects an appropriate operating system license using the same method as above.

The selection program of the VCMDS will then select the application licenses using the same method as above.

The VCMDS runs any prebuild scripts if necessary, and then runs the build script.

The VCMDS builds dynamic connection URL's for each student interface, and the reservation indicator is changed to "Building."

The VCMDS sends all necessary variables for building the servers to the Cisco Cloupia Enterprise program which controls the VMware VCenter.

After the build process has completed, the VCMDS pings the server to see if it is running properly. If the server is operating properly, the VCMDS creates a flag. The VCMDS will check every minute for new flags, which are parsed for resulting information. Action is taken based on the resulting information.

If the build operation passes there are no other servers on the reservation to wait for, the course link is made available for the student to click on.

If the build operation fails, the particular asset is marked as a failure, and the build is attempted again with a backup asset. A reservation currently undergoing a rebuild operation is marked as yellow.

If the build operation fails twice, the build status is changed to red to indicate failure, and the VCMDS informs the provider of the VCMDS of the failure, such as by email. If the course fails to start by the scheduled course end, the units are credited back to the client.

Unused spare units are moved to active status, and are kept as part of the main group. Repaired assets are set as spares.

7. Automated Course Cleanup

The program system manager runs programs to cleanup tables, close old reservations, and change reserved status back to available. At the end of a month, the program system manager may build out tables one month at a time to keep a set of future tables ready for implementing. For example, the program system manager may build twelve months of tables.

The program system manager may also move all old reservations to history tables after a certain period, such as six months. The program system manager selects the student server, operating system, and application with the oldest used last date (stale date) and fills in the reservation build table for each server under the reservation. The program system manager launches the setup scripts found in the course table in the order and time delays between prebuild or post reservation. The program system manager monitors the retuning directory for status flags before launching the next script. When the last one returns with a pass, the program sets the server as ready.

In addition to operating as a cleanup, the postbuild can be a build script known as prebuild for a script with a high volume, thus eliminating a wait time for a build.

8. Additional Problems Solved

The VCMDS is able to bypass firewalls because it exclusively uses the browser by way of using ports 443 secure and 80 http ports (which is available on all systems for access to our application learning environment).

The reservation system assigns a Class ID to every class with a reservation ID for every student.

Exemplary Differentiating Features

The VCMDS automatically builds and delivers online courses without intervention from personnel.

The VCMDS is contained inside of an Oracle database with APEX on an HTTP web server. The VCMDS permits complete customer control over all classroom or courseware functions and course/server scheduling with automated time zone management.

The VCMDS is controlled using a browser based dashboard interface. Customers therefore do not need to download any application software, and customers can access the VCMDS through any firewall without opening any additional ports because everything is port 443 or 80. VCMDS uses Web-Connect for Microsoft Windows, UNIX and Linux. The VCMDS builds a dynamic URL for each connection and gives the student the right connection for whatever type of operating system. Since everything is in our cloud, security is controlled, providing a safe learning experience. Since everything is accessed through a browser, there is nothing on a user's system to cleanup. Setup for each course using the VCMDS is automated.

VCMDS can be used to select and coordinate all types of servers that execute educational software applications using any operating system or programming language (e.g., UNIX, Linux, Windows, C, etc.). VCMDS can simultaneously operate 1-10,000 servers (virtual or physical). Any software may be used.

VCMDS can automatically rebuild a student's virtual lab or classroom in response to a student's click on a "rebuild" button.

VCMDS permits allocation of multiple students to one server or multiple servers to one student for online education purposes, and coordinates operations of multiple servers.

VMCDS automatically monitors license usage and compliance.

Specifications Of The Preferred Embodiment

The software used by the VCMDS is Oracle 11.2g, Apex 4.1, VMware 4.1, VMware CLI for Linux, Red hat 5.1 Linux, Window Server 2008/R2, Citrix Application Server and all the client OS and Application licenses for the students' systems. The programs reside inside the Oracle database in packages written in PL SQL and Java using the Oracle APEX 4.1 application for the presentation on the web.

The VCMDS is front ended by a Citrix Net Scalar that provides security, speed and ability to navigate the customers and our firewalls without degrading security. Users of the VCMDS are required to login, and separate security levels are applied to each type of user (e.g., administrators, account managers, instructors, and students.

For each user, the basic design of the browser interface for the VCMDS is a dashboard with four panels with function keys at the bottom of each panel. A Navigation panel is shown along the left side of the Dashboard with tabs along the top. At the top of each screen, function keys and information are displayed, including: Time zone and Region, Clock, User name, Profile Information, Color Display format, Client Name and Number of Units left to reserve courses.

Every Client, User and course has a profile. Services are provided by the VCMDS based on the setup.

The system is based on an hourly clock tracked by an Oracle scheduler. The scheduler runs in the background and operates based on launch table scripts responsible for cleanup of old reservations, launching new builds, setting the status flags based on the decoding of the results of the build. This is all done by the launch table scripts items for a given course.

The scheduler generally builds out the calendar table one month at the end of every month. The Customer can only reserve 3 months into the future with a first come first served rule. The customer can cancel any reservation before build time and edit any scheduled day and time before it's built and ready. You can schedule a reservation and select any day for each day of the course does not have to be consecutive days. This would accommodate college professors that teach on a weekly schedule for a semester.

Services that go along with every client are added to the system and can be added to the client profile at setup. The VCMDS will track the billing of these items. VCMDS can also provide standard charts, or custom charts for a service charge. The VCMDS includes an internal email system. The customer can schedule future courses or update current courses. Courses can be extended if needed.

VCMDS includes a customized e-mail formatter that can be used to keep registered users informed of course changes. VCMDS also includes a notification area that is common to all instructors, students and other members loaded into the system. There is an information notification area that VCMDS has for the account managers and they have the same for all client (Instructors and students) members that are loaded into the system.

The VCMDS accesses students' servers through dynamic path building through the Net Scalar through the Putty Application to the IP address of the VM system. System information from client passwords are MD5 hashed to prevent information from being compromised.

Description in Connection with Figures

FIG. 1 is a schematic of a virtual classroom delivery system in accordance with an embodiment of the invention. FIG. 1 includes a teacher user computer 102, an admin user computer 104, a student user computer 106, internet 108, firewall 110, a first server 112, a second server 114, a third server 116, a virtual machine host 118, and a data store 120.

The teacher user computer 102, the student user computer 104, and the admin user computer 106 represent computing devices (e.g., desktop computers, laptops, tablet computers, smartphones, or other mobile devices) that may be used by a teacher, administrator, and student user to access the virtual classroom delivery system via a standard internet browser (e.g., Internet Explorer, Chrome, Firefox, Opera, etc.). In other embodiments, the VCMDS may be accessed using graphical user interfaces provided by software installed on a user's device other than a standard internet browser. The first server, second server, third server, any other server(s), virtual machine host(s) and data store(s) are preferably run by a virtual classroom provider who preferably is a distinct person or organization from the teacher, administrator and/or student individuals and/or organizations, although in other embodiments need not necessarily be so.

The first server 112 may be a Main Server for the virtual classroom delivery system, and may use Red Hat Linux 5.1, and Oracle Database 11g with APEX 4.1. The second server 114 may be a VMware Server using Win Server 2008/R2, 4.1 V Center and 4.1 V Sphere. The third server 116 may be a Citrix App Server. The Data Store 120 may be a VMware Data Store. The Virtual Machine Host 118 may be VMware Hosts and VM Servers Students machines.

The teacher user computer 102, the student user computer 104, and the admin user computer 106 may communicate with the first server 112 through the internet 108 and the firewall 110. The first server 112 may communicate with each of the second server 114 and the third server 116. The virtual machine host 118 may communicate with each of the third server 116, the second server 114, and the data store 120. The data store 120 may also communicate with the second server 114.

The teacher user computer 102, the student user computer 104, and the admin user computer 106, as well as all of the other elements in FIG. 1, may represent one computer, one user and/or one element or may represent multiple computers/users/elements.

Figure 2:
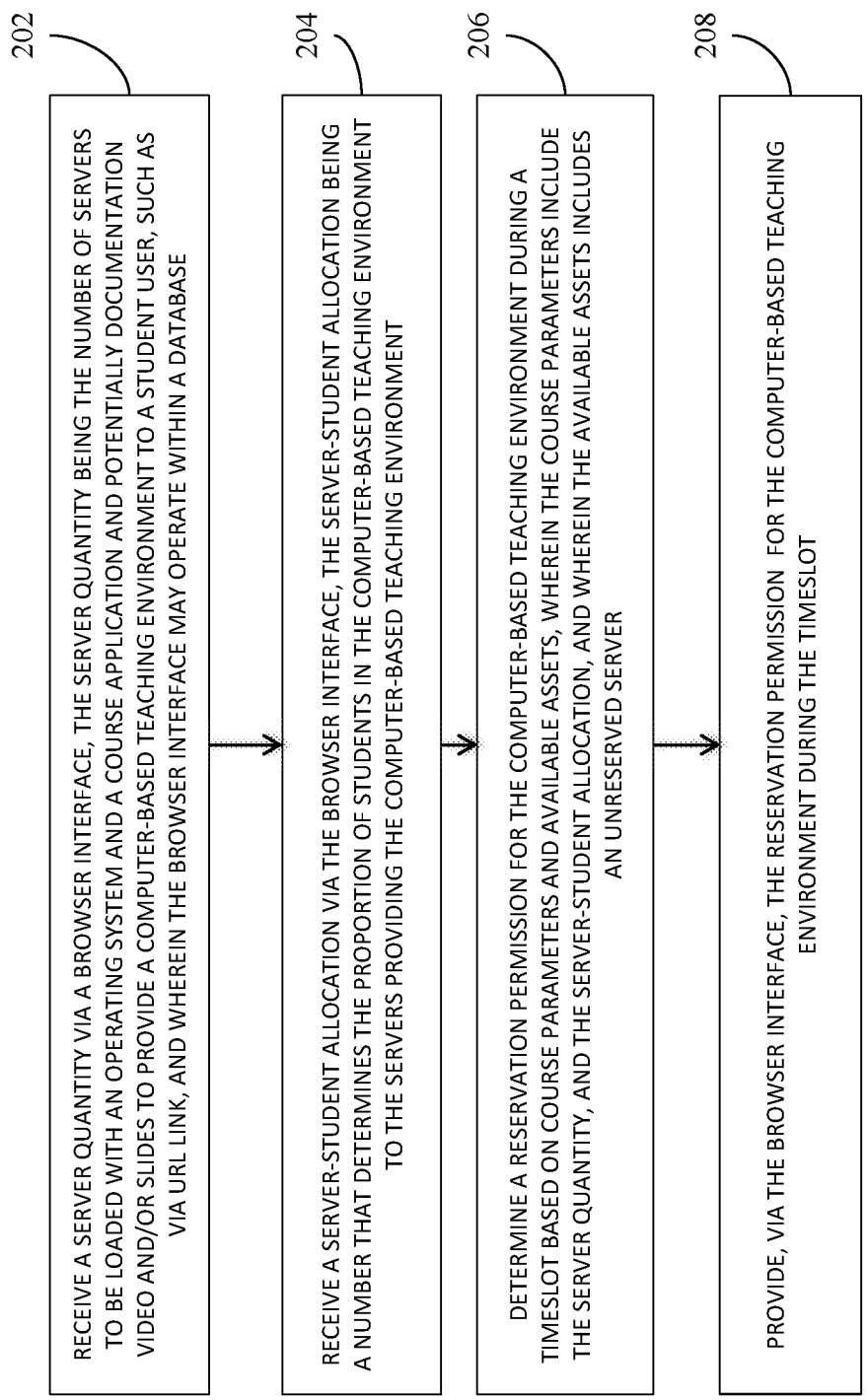
FIGS. 2-4 are process flows of virtual classroom delivery methods in accordance with various embodiments of the invention.
Figure 3:
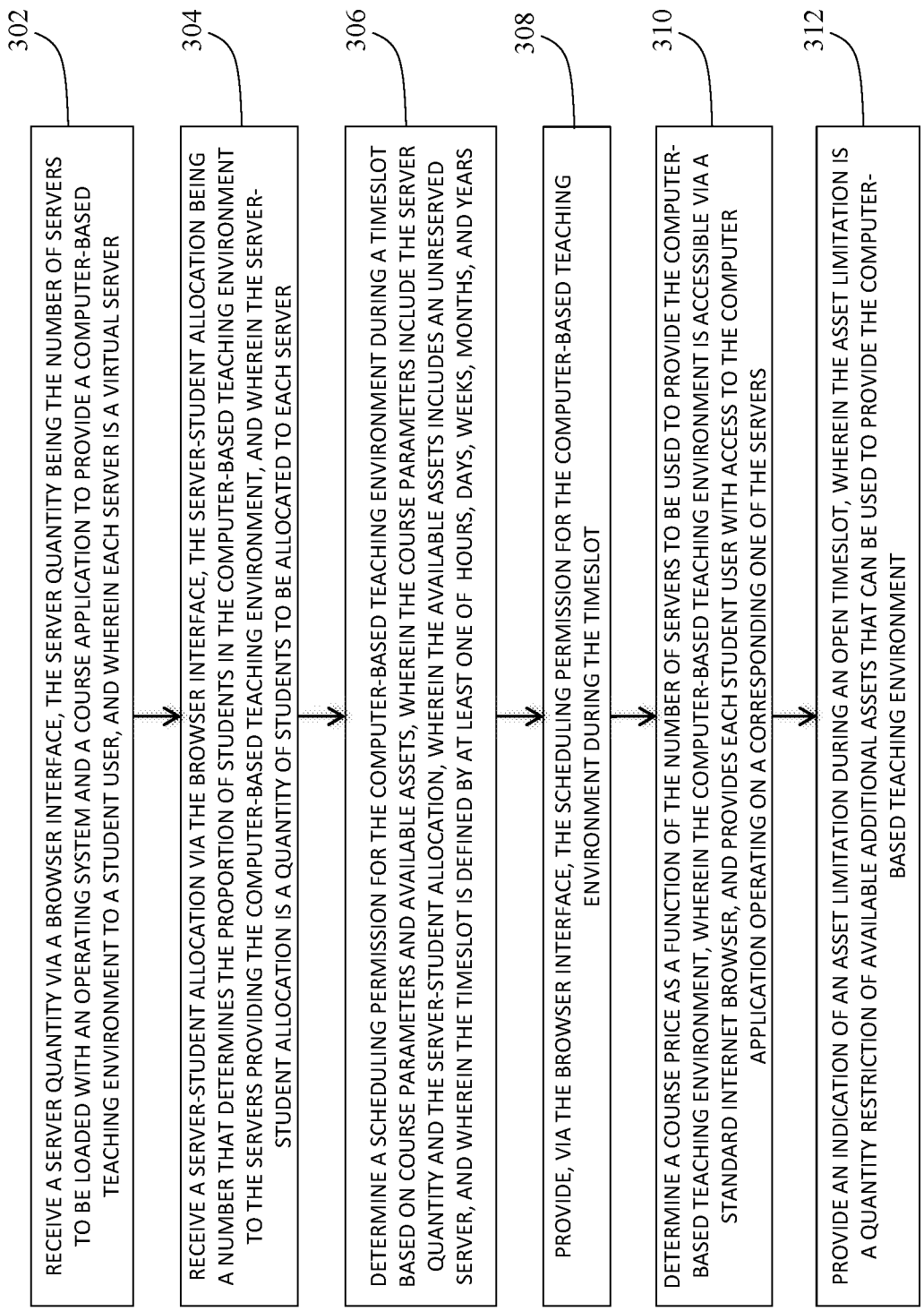
Figure 4:
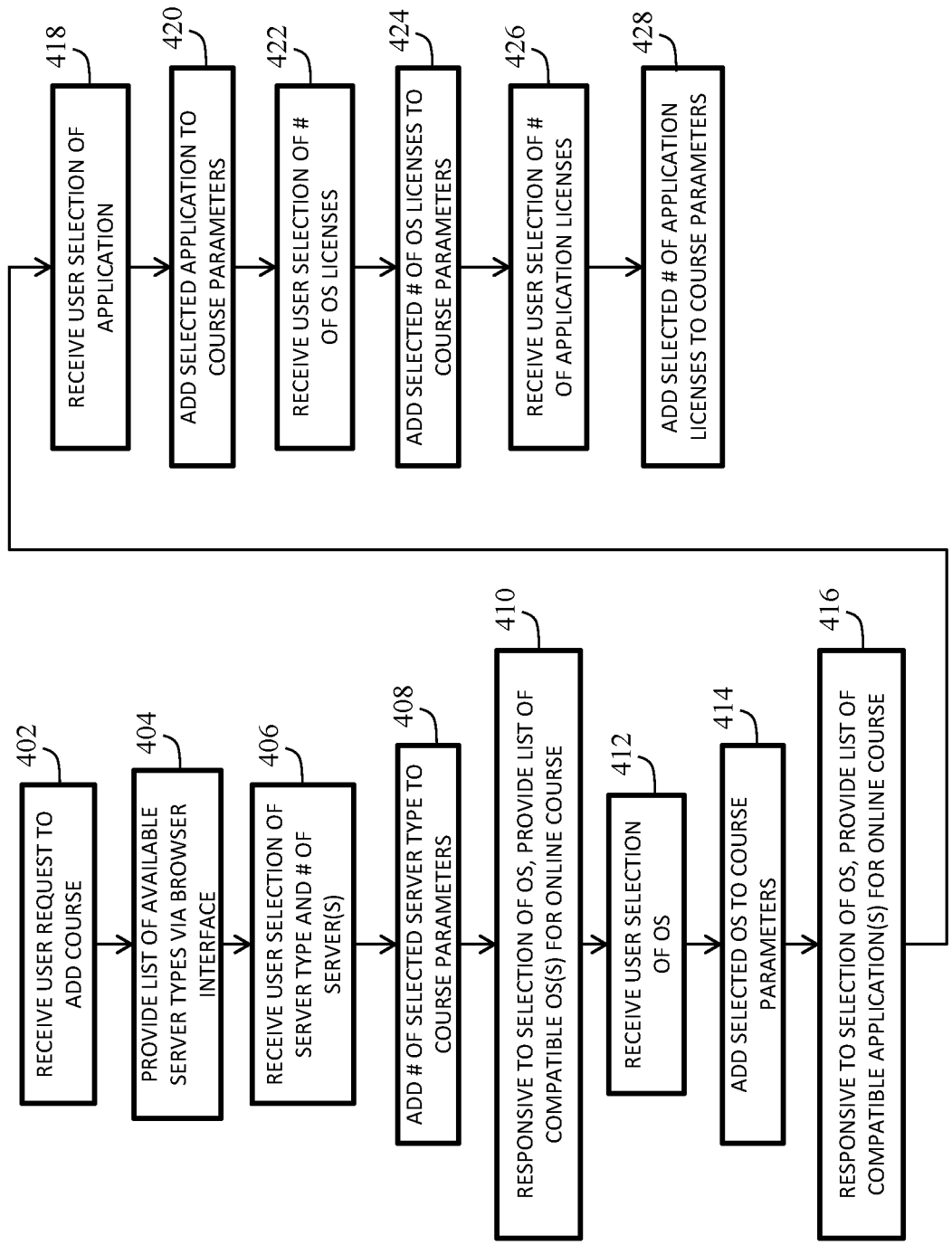

FIGS. 2-4 are process flows of virtual classroom delivery methods in accordance with various embodiments of the invention.

With respect to FIG. 2, in operation 202, the VCMDS receives a server quantity via a browser interface, the server quantity being the number of servers to be loaded with an operating system and a course application to provide a computer-based teaching environment to a student user. For example, a teacher or administrator may choose how many servers should be allocated to a course.

The VCMDS may include one or more of the first server 112, the second server 114, the third server 116, and the virtual machine host 118.

In operation 204, the VCMDS receives a server-student allocation via the browser interface, the server-student allocation being a number that determines the proportion of students in the computer-based teaching environment to the servers providing the computer-based teaching environment. For example, the administrator or teacher may choose to allocate three students per server. In other embodiments, the administrator or teacher may choose to allocate two or more servers to each student. By allowing the teacher and/or administrator to determine the ratio of students to servers via the browser interface, the VCMDS may permit a teacher or corporation providing a course to customize the balance of computing performance against the cost of implementing more servers relative to the number of students.

In some embodiments, the ratio may be adjusted between course sessions. In other embodiments, the number of servers may be adjusted while a course is being taught, such as by pausing a course, changing the student-server allocation, and rebuilding the course on the new number of servers.

For example, multiple students' applications may be consolidated onto a smaller number of servers, or additional servers may be used to assist with running applications for a group of students.

In operation 206, the VCMDS determines a scheduling permission for the computer-based teaching environment during a timeslot based on course parameters and available assets, wherein the course parameters include the server quantity, and the server-student allocation, and wherein the available assets includes an unreserved server. The reservation permission may allow or prevent a time slot from being available for the computer-based teaching environment (e.g., the virtual classroom). The time slot may be a one hour increment of time.

The course parameters may include the number of servers needed for the course, the number of operating systems and/or applications, the number of licenses, the start and end times for the course, and/or the total hours, days, or weeks needed for the course. The available assets may include available servers, memory, operating systems, applications, licenses, and slots for students.

In operation 208, the VCMDS provides, via the browser interface, the reservation permission for the computer-based teaching environment during the timeslot. The reservation permission may be represented by colors and/or text on a calendar. Available dates may be represented using the color green, red, or white, while non-available or restricted availability dates may be represented using other colors. Dates with limited resources for calendaring all or a part of a course may also be identified with text indicating limited resources, such as a statement that 5 servers remain for allocation to the course.

FIG. 3 illustrates another process flow of the VCMDS and method, according to an embodiment. In operation 302, the VCMDS receives a server quantity via a browser interface, the server quantity being the number of servers to be loaded with an operating system and a course application to provide a computer-based teaching environment to a student user, and wherein each server is a virtual server.

In operation 304, the VCMDS receives a server-student allocation via the browser interface, the server-student allocation being a number that determines the proportion of students in the computer-based teaching environment to the servers providing the computer-based teaching environment, and wherein the server-student allocation is a quantity of students to be allocated to each server.

In operation 306, the VCMDS determines a reservation permission for the computer-based teaching environment during a timeslot based on course parameters and available assets, wherein the course parameters include the server quantity and the server-student allocation, wherein the available assets includes an unreserved server, and wherein the timeslot is defined by at least one of seconds, minutes, hours, days, weeks, months, and years.

In operation 308, the VCMDS provides, via the browser interface, the reservation permission for the computer-based teaching environment during the timeslot In operation 310, the VCMDS determines a course price as a function of the number of servers to be used to provide the computer-based teaching environment, wherein the computer-based teaching environment is accessible via a standard internet browser, and provides each student user with access to the computer application operating on a corresponding one of the servers.

In operation 312, the VCMDS provides an indication of an asset limitation during an open timeslot, wherein the asset limitation is a quantity restriction of available additional assets that can be used to provide the computer-based teaching environment.

FIG. 4 is an illustration of another process flow of the virtual classroom delivery system and method, according to an embodiment. In operation 402, the VCMDS receives a user request to add a course. The user may be a teacher or an administrator who wishes to add a course that may be provided by the VCMDS.

In operation 404, responsive to the user request of operation 402, the VCMDS provides a list of available server types via the browser interface. The VCMDS may provide options for physical and/or virtual servers with different processing capabilities, memory allocations, operating system types, software compatibility, and manufacturers.

The user may wish to set up a class using particular machines that are better suited for the software to be taught, or the user may wish to upgrade or downgrade the virtual or physical machines supporting a course. The changes in hardware may change other options provided by the VCMDS, and may ultimately affect the scheduling operation of the VCMDS for a particular course as well as pricing for the course.

In operation 406, the VCMDS receives user selection of server type and quantity of server(s). The user may select the type and quantity of servers that they wish to have supporting a virtual online course.

In operation 408, the VCMDS adds the selected quantity of selected server type(s) to course parameters that are used by the VCMDS for building the course, determining scheduling availability, and/or determining course pricing.

In operation 410, responsive to the user's selection of operating system(s)(OS), the VCMDS provides a list of compatible operating system(s) for the online course. The list of OS(s) may be acquired from a list of compatible operating systems for each of the selected virtual or physical machines.

In operation 412, the VCMDS receives the user's selection of one or more operating systems. For example, an administrator or teacher may select a version of Linux, Windows, Vista, Leopard, etc., depending on the type of virtual or physical server(s) that were selected by the user.

In operation 414, the VCMDS adds the selected operating system to the course parameters. At a designated time before the course is scheduled to begin, the VCMDS may automatically build the course servers and software needed for the course. Building may refer to creating the virtual machines and/or activating or otherwise enabling selected physical servers, installing operating systems or copying disk images of installed operating systems, installing software applications or copying disk images of installed software, and/or any other steps needed for preparing a machine to be accessed by a remote student, teacher, and/or administrator.

In operation 416, responsive to the user's selection of operating system(s), the VCMDS provides a list of compatible application(s) for an online course. The administrator and/or teacher may then add one or more applications to be installed on the virtual or physical machines prior to the start of the course.

In operation 418, the VCMDS receives a user selection of one or more applications. The teacher or administrator may select the one or more applications via a drop down menu, a list of buttons, text entry, or other browser interface using a standard internet browser.

In operation 420, the VCMDS adds the selected application(s) to the course parameters, which may be used for building the course, determining scheduling availability, and/or determining a course price.

In operation 422, the VCMDS receives the user selection of a quantity of operating system licenses. The administrator or teacher may select the number of licenses that will be needed based on the number of software copies that will be used and/or the number of users of the software.

In operation 424, the VCMDS adds the user's selected quantity of operating system licenses to course parameters, which may be used for building the course, determining scheduling availability, and/or determining a course price. The administrator or teacher may select the number of licenses that will be needed based on the number of software copies that will be used and/or the number of users of the software.

In operation 426, the VCMDS receives the user's selection of a quantity of application licenses. The administrator or teacher may select the number of licenses that will be needed based on the number of software copies that will be used and/or the number of users of the software.

In operation 428, the VCMDS add selected quantity of application licenses to course parameters, which may be used for building the course, determining scheduling availability, and/or determining a course price.

Figure 5:
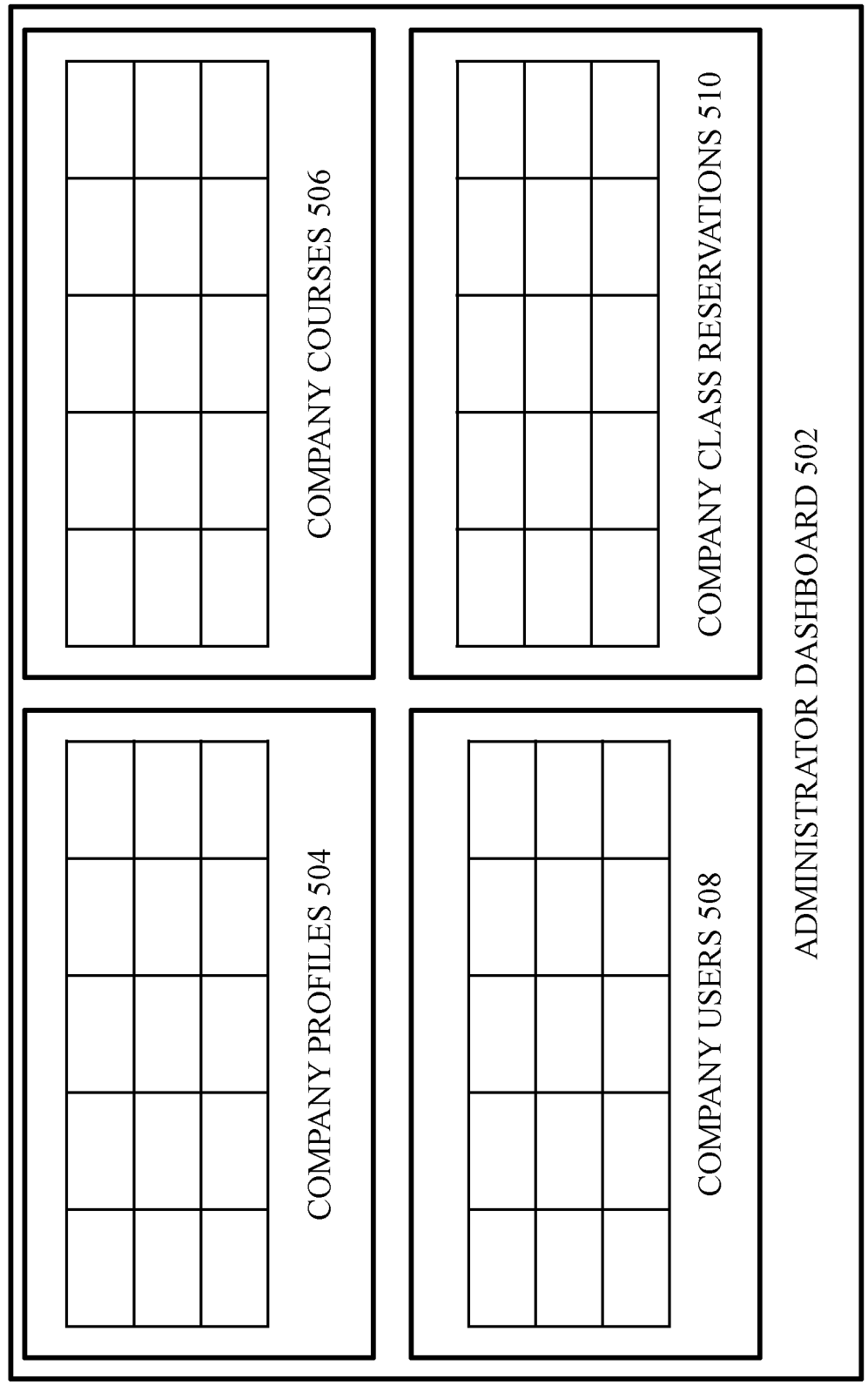
FIG. 5 is an illustration of an administrator view, according to the preferred embodiment of the invention.

FIG. 5 is an illustration of an administrator view, according to an embodiment of the invention. The administrator view may be divided into four panels, including company profiles 504, company courses 506, company users 508, and company class reservations 510.

Company profiles 504 may present information about each company, including account manager, account status, number of units, units used, units available, and end service date. The units may be an internal currency for the VCMDS that may be used to provide payment for a course. Each unit may represent an hour of student time to simplify a teacher or administrator's ability to determine how much course time can be paid for, or how many additional units are needed. In other embodiments, the value of the unit may be based on other standards, given a fixed exchange rate with commonly used currencies, or may simply represent U.S. dollars or another currency.

Company courses 506 may display information about a course such as its category, number, version, creation date, and update information.

Company users 508 may display information about users such as user name, assigned roles, login count, last successful login, and their last IP address.

Company class reservations 510 may display information about a reservation such as instructor name, number of students, and reserved dates.

FIG. 6 is an illustration of a user interface for managing a server group, according to an embodiment of the invention. The manage server group 602 interface may include a drop down menu for selecting an asset available column name, which allows an administrator to pick a group designation for a group of servers.

The manage server group 602 interface may also include fields for group description, group available from, group expiration date, and enablement. These fields may permit an administrator to describe the group, and to set start and end dates for when the group will be available to provide courses. Reservations for courses in the group may be allowed only between the start and end dates. Enablement may allow the group to accept reservations between the start and end dates, and restrict reservations if the group is not enabled.

Figure 7:
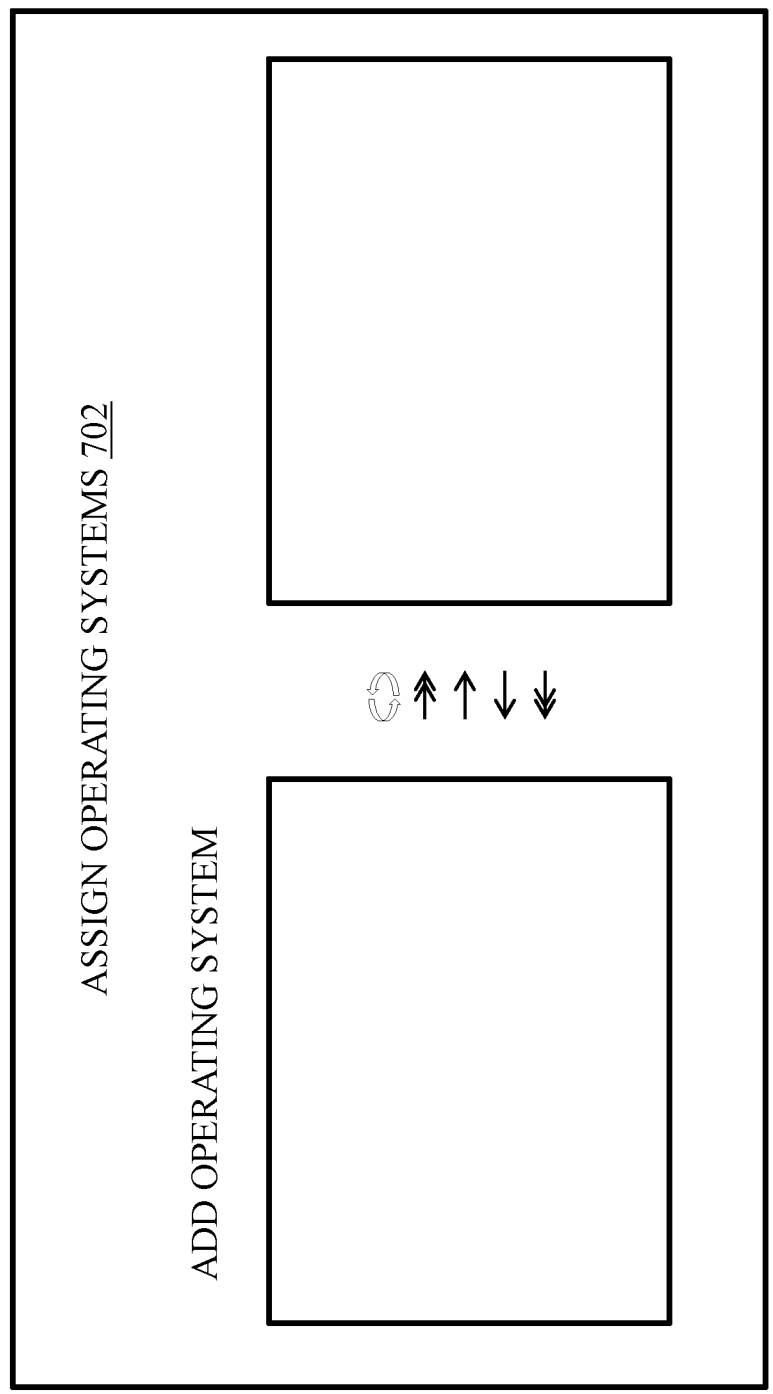
FIG. 7 is an illustration of a user interface for assigning operating systems, according to the preferred embodiment of the invention.

FIG. 7 is an illustration of a user interface for assigning operating systems, according to an embodiment of the invention. The assign operating systems window provides a list of operating systems that are compatible with the chosen servers, which may be added to a list of selected servers on the right using individual arrows, or double arrows to permit movement of all listed operating systems into the right hand column.

FIG. 8 is an illustration of a user interface for adding a server to the group according to an embodiment of the invention.

FIG. 9 is an illustration of an administrator interface for managing a server, according to an embodiment of the invention.

The manage server 902 interface may allow an administrator to make selections with respect to parent server, whether the server is a virtual or physical server, the server group, the host name, whether the server is in use, the start and end date for the availability of the server, the number of processors, the amount of memory, NICS (Network Interface Connection), the manufacturer, the class reservation ID, the asset number, and whether the server is enabled.

FIG. 10 is an illustration of a user interface for managing an operating system, according to an embodiment of the invention. The manager operating system 1002 interface may allow a user to make selections with respect to operating system name, revision number, amount of memory, asset tracking, RDP connection, Telnet connection, SSH connection, VNC connection, and asset available name. This allows VCMDS to associate a group name to an asset column number. VCMDS assigns and tracks each asset.

Figure 11:
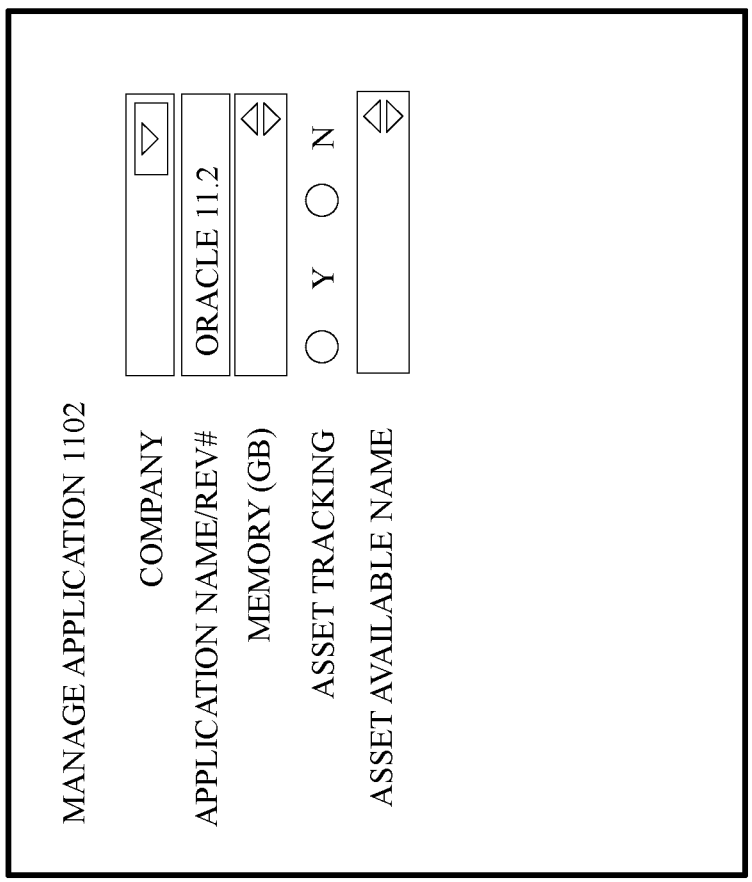
FIG. 11 is an illustration of a user interface for managing an application, according to the preferred embodiment of the invention.

FIG. 11 is an illustration of a user interface for managing an application, according to an embodiment of the invention. The manage application 1102 interface may allow a user to make selections with respect to company, application name/revision number, amount of memory, asset tracking. This allows VCMDS to accommodate all applicable applications within groups that require specific amount of memory and network cards.

FIG. 12 is an illustration of a user interface for adding a license, according to an embodiment of the invention. The add license 1202 interface may permit an administrator or teacher to add, enable, or otherwise modify licenses for operating systems and/or applications.

FIG. 13 is an illustration of a user interface for adding a course, according to an embodiment of the invention. The add course 1302 interface may permit an administrator or teacher to make selections with respect to course type, such as whether the course will use a virtual classroom, whether the testing will be performance based, or whether the course will be self paced. The add course interface 1302 may also permit a user to make selections with respect to company, parent course (e.g., a course prerequisite), course name, available dates, course duration, minimum or maximum course durations, default start and end times, maximum extend time, daily schedule limit.

Course duration may vary based on customer course structures or curriculum paths. The user's selection of course parameters allows the system to automatically adjust dates and times for the proposed class on the calendar. The time and the adjustments are updated to reflect each user's time zone. The customer purchases as much or as little time for their course as they need, and the VCMDS accommodates any limitations or restrictions desired by the user.

Figure 14:
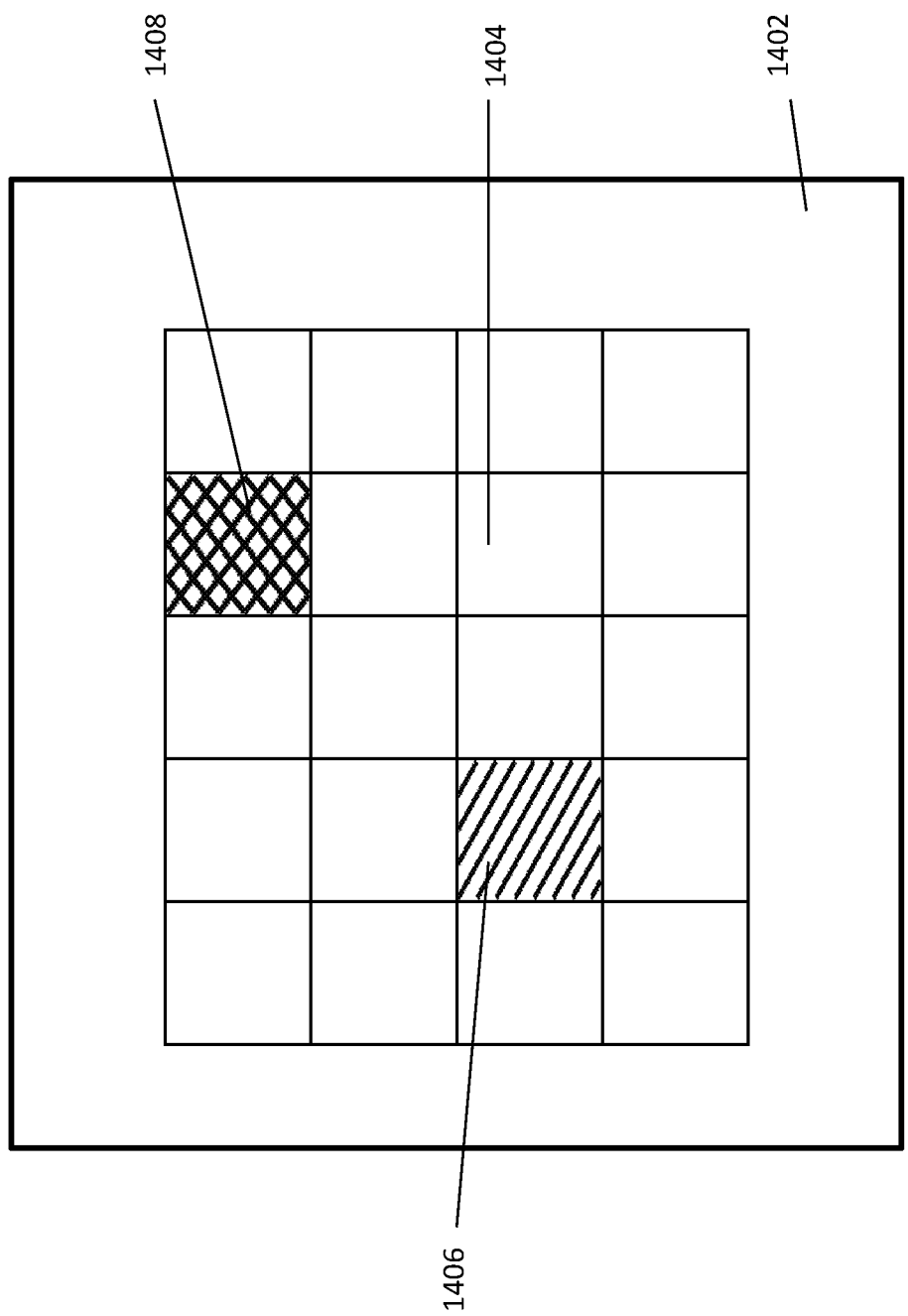
FIG. 14 is an illustration of a user interface for scheduling a course, according to the preferred embodiment of the invention.

FIG. 14 is an illustration of a user interface for scheduling a course, according to an embodiment of the invention. The calendar 1402 may be a monthly, weekly, or day view. 1404 represents a white time slot, indicating that there is no conflict for that time period. 1406 represents a yellow time slot, indicating that there is a conflict, but part of the time slot is available. 1408 represents a red time slot, indicating that no part of the time slot is available for making a reservation.

Figure 15:
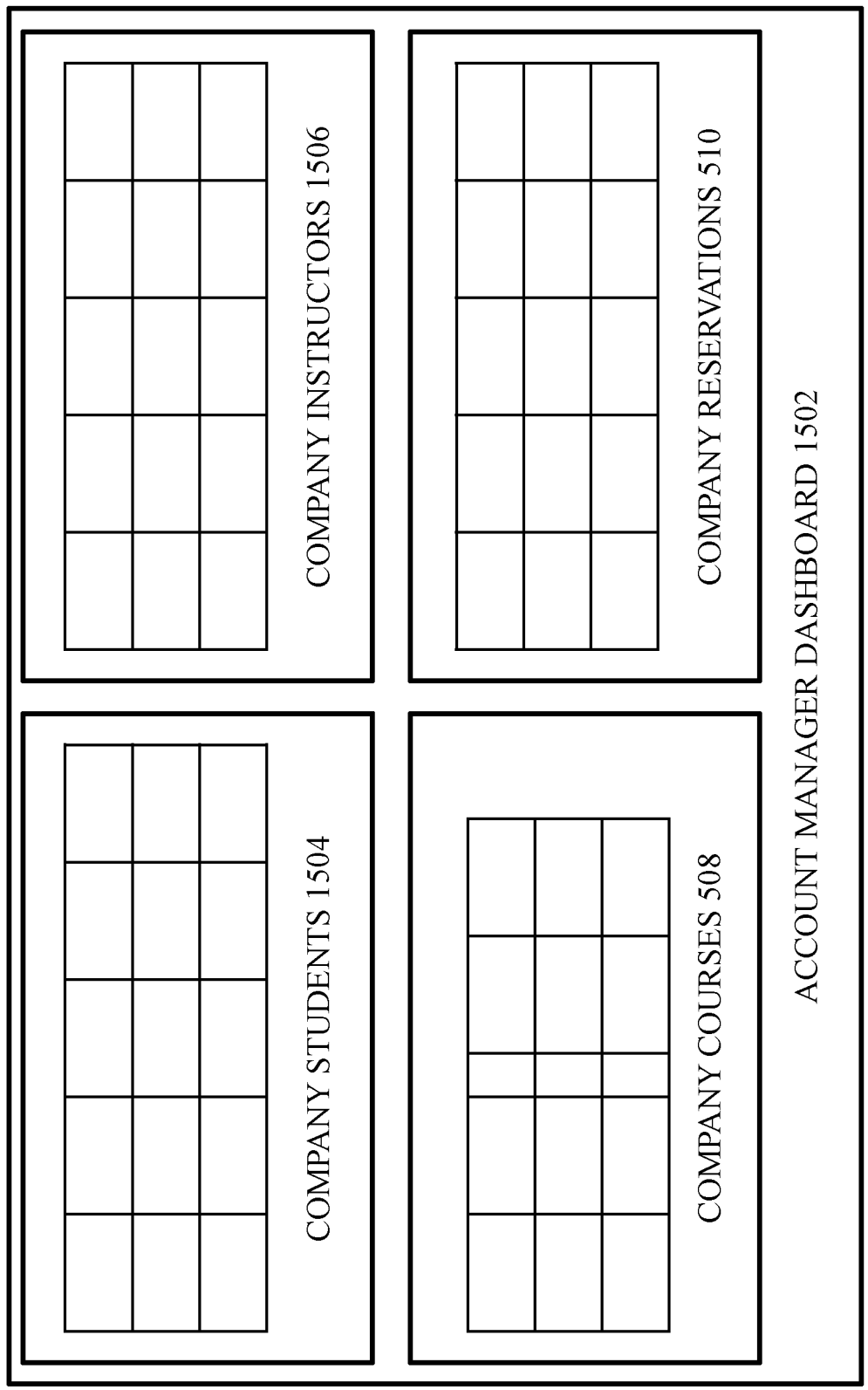
FIG. 15 is an illustration of a user interface for an account manager dashboard, according to the preferred embodiment of the invention.

FIG. 15 is an illustration of a user interface for an account manager dashboard, according to an embodiment of the invention.

Figure 16:
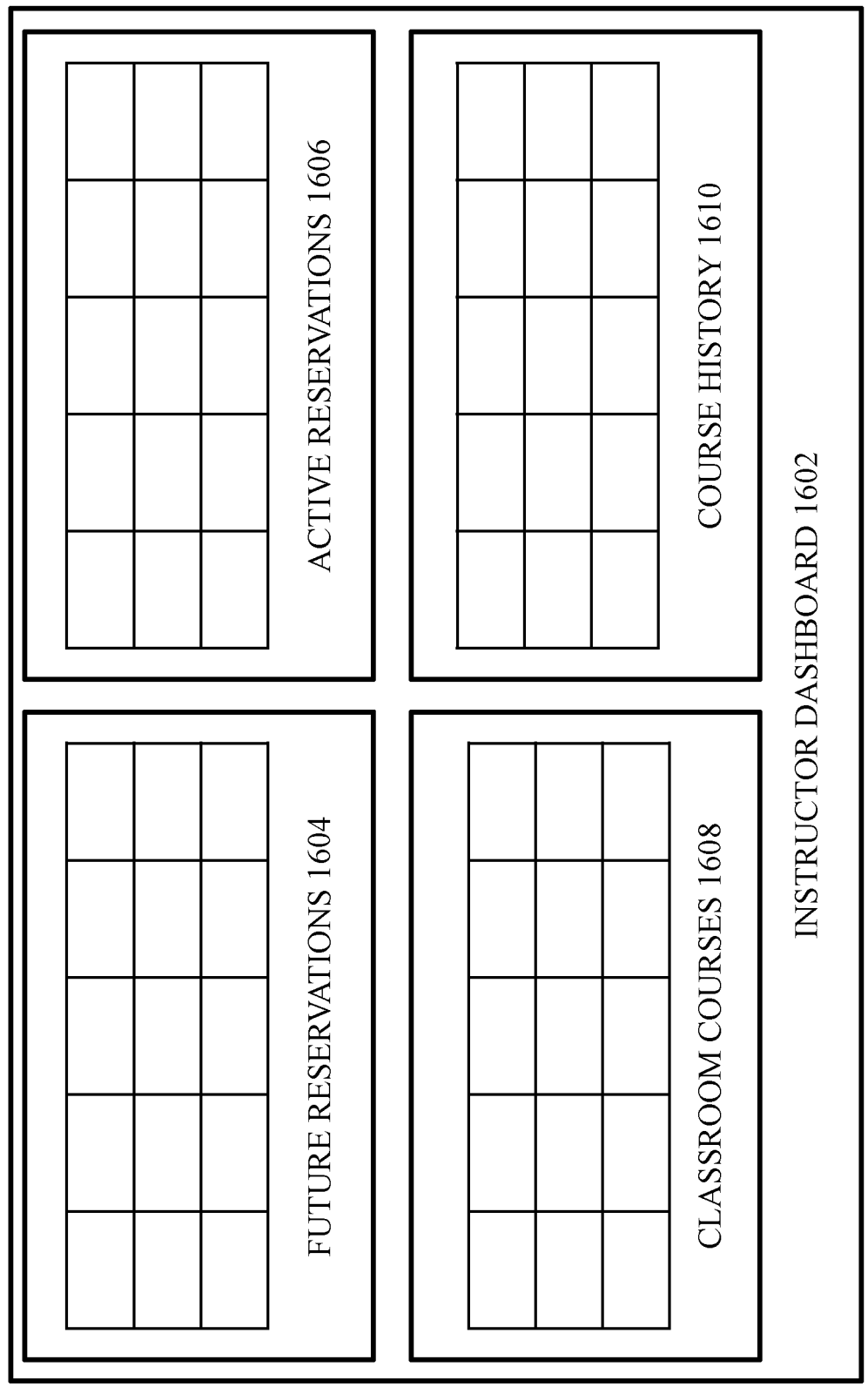
FIG. 16 is an illustration of a user interface for an instructor dashboard, according to the preferred embodiment of the invention.

FIG. 16 is an illustration of a user interface for an instructor dashboard, according to an embodiment of the invention.

Figure 17:
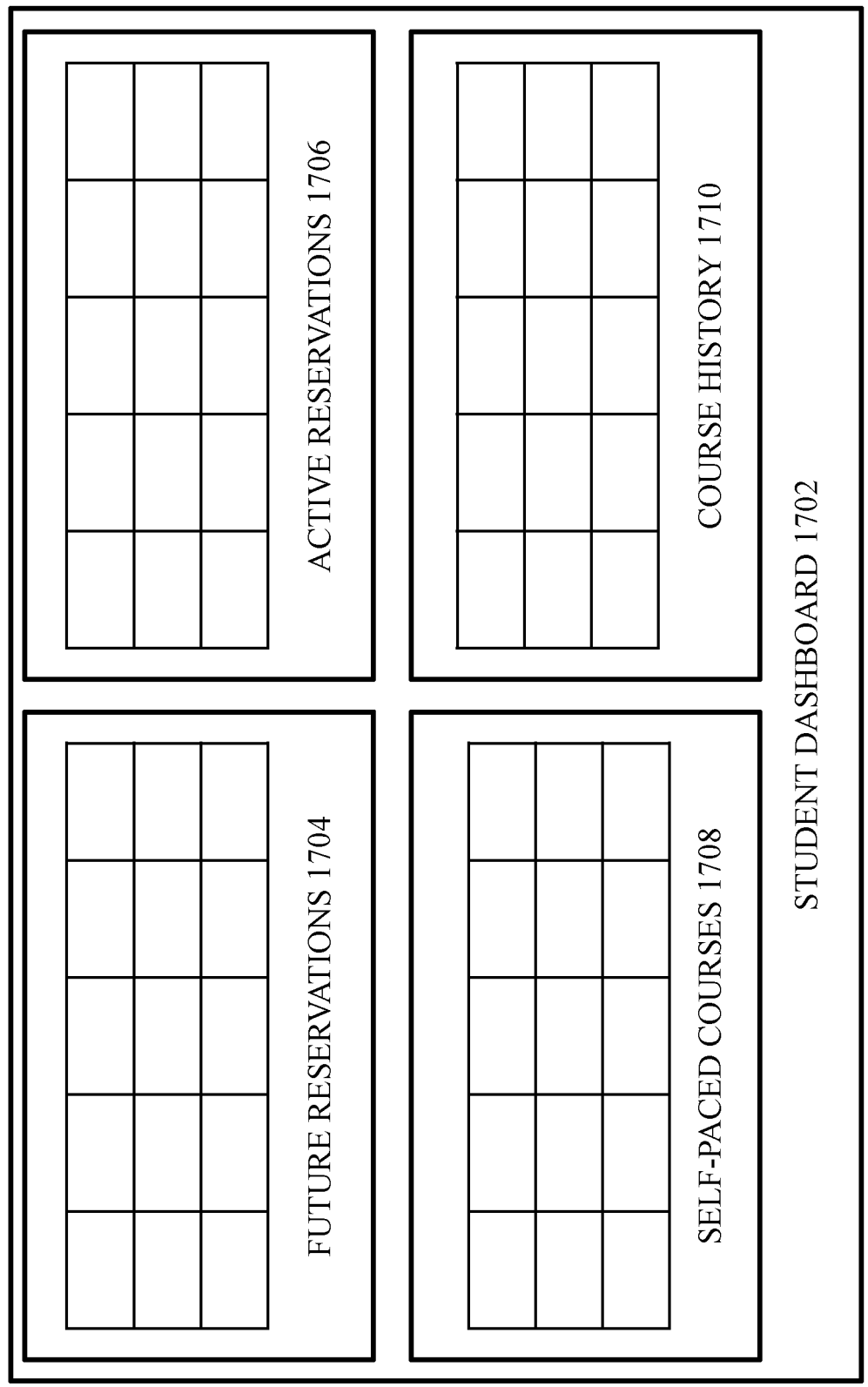
FIG. 17 is an illustration of a user interface for a student dashboard, according to the preferred embodiment of the invention.

FIG. 17 is an illustration of a user interface for a student dashboard, according to an embodiment of the invention.

FIG. 18 is an example of a computing system diagram, and includes processing circuitry 202, input/output devices 204, speakers/headphones 208, camera 210, display 212, computing equipment 214, and storage 216. The computing system may represent a server, a virtual server, a desktop computer, a tablet computer, a mobile device, or any other electronic device having processing circuitry 202.

Storage 216 may include one or more different types of storage. For instance, storage may include flash memory, hard drive storage, volatile memory, etc. Storage 216 may be used for storing asset tables, user information, company information, and reservation information.

Processing circuitry 202 may be used to control operations of a computing device, such as the servers and computers of FIG. 1. Processing circuitry 202 may be used to check availability of assets to determine a reservation permission or any other operation of the systems and methods described herein.

Input/Output devices 204 include speakers/headphones 206, the microphone 208, the camera 210, and the display 212, and may include other devices such as keyboards, mice, touchpads, scanners, etc. The input/output devices 204 may allow the VCMDS provider's software to exchange data with other devices.

Computing equipment 214 may be any suitable computer such as customer teacher computer 102, provider administrator computer 104, customer account manager computer 126, or customer student computer 106. The computing equipment 214 may also include one or more of the first, and second servers, 112, 114, or the virtual machine host 118.

Definitions

APPLICATION LICENSE: This is the application license for a server based on the course requirements.

APPLICATION: This a course requirement for the server based on the course description.

ASSET: Items (e.g., server, operating system, application, virtual seats VC and copyright licenses) required to build a course based on the course definitions.

BROWSER: The browser is the access interface using html 5 into the VCMDS system.

BROWSER-BASED APPLICATION: A browser based application is one that stands alone and does need anything other than the browser to deliver the course and connections.

BUILD (as in build a class): Putting all the pieces together to form a learning environment for a student to access in a course connection interface.

CLASS ID: A class ID is an assigned number for an instructor led training. It can have multiple reservation ID contained in it.

COMPUTER-BASED TEACHING ENVIRONMENT: a set of items (a virtual classroom, virtual lab, or testing environment) delivered virtually through one interface to create learning environment for student experience.

COURSE APPLICATION: Curriculum supplied by customer or available through VCMDS supplier (e.g., a software program for a course) based on the course definition.

DOCUMENTATION COPYRIGHT LICENSE: The number of copies the company has for documentation required for a course.

DOWNLOAD USERS: Exporting out all your users to a CSV excel file to have a backup of user definitions.

EXTENSIONS (student or course): The extension is for a course end time the max limit is defined in the course table (during course) creation and can go as high as 3 hours in ½ hour increments, as long as there are free assets available.

GUI: Graphic User Interface is a non-browser interface which one has to install on one's pc.

INDICATION OF AN ASSET LIMITATION: As part of supply and demand, if the customer is attempting to make a reservation, there is a demand on the VCMDS to supply the assets necessary. When assets are not available or limited, the VCMDS will inform customer by way of an indication of an asset limitation. In some embodiments, an indication may be a color change on a calendar, such as in the background, on text, or in an outline around something on a calendar. An indication may also be a text-based message that is provided through the browser interface, via email, text message, pop-up, or other communication method.

INSTRUCTOR RIGHTS: The instructor has the right to make reservations for instructor led courses and then assign students to the class, but he also can change dates, times, student assignments, extend, transfer and cancel reservations.

MEMORY UNIT: This is the amount of memory a server requires to run the operating system and applications.

MEMORY-STRUCTURES: is what is built depending on the course specifications for the operating system and applications demand.

NON-SEQUENTIAL TIMESLOT: This allows a customer to calendar any course in a non-consecutive timeslot for each reservation (e.g. during different dates and time for the reservation). A non-sequential timeslot is separated from another timeslot by at least one intervening timeslot.

OPERATING SYSTEM LICENSE: This is what is required for any windows operating system to remain compliant with the license agreements.

OPERATING SYSTEM: This is what is needed by definition of a course there are licensed operating systems and unlicensed or open systems like UNIX and Linux. The VCMDS delivers both.

REPORTS: This is an area that an account manager can access to get graphs and reports of the courses delivered and upcoming courses in the future.

RESERVATION ID: This the lowest level of a reservation number and is assigned to one student or students if there is more than one student per server.

RESERVATIONS: This is a guaranteed number assigned at reservation creation so when the reservation arrived date comes you have all the materials for your class.

RESERVATION PERMISSION: Whether a reservation is permitted or not.

When a customer requests a course reservation, the VCMDS will grant such reservation upon availability of asset or deny the reservation due to lack of asset availability and will notify the customer.

SERVER DELIVERED VIRTUALLY: This means a server can be located in one data center and setup for a course and accessed by anyone in the world.

SERVER GROUP: This is a group of servers that have a common trait that is required by a certain group of courses.

SERVER STUDENT ALLOCATION: a number that determines the proportion of students in the computer-based teaching environment to the servers providing the computer-based teaching environment. For example, the number may be a ratio of students to servers or a ratio of servers to students. Reservations per student are granted by the VCMDS, which allocates one or more virtual servers as needed to the reservation for building the course.

SERVER TABLE: This is where the available or unavailable server information is stored.

SERVER: A physical or virtual computer on which a server computer program operates. A server computer program awaits and fulfills requests from client programs in the same or other computers. A given application in a computer may function as a client with requests for services from other programs and also as a server of requests from other programs. Specific to the Web, a Web server is the computer program that serves requested web pages or files, such as HTML pages or files, to requesting client programs. One or more servers are assigned to a reservation as part of the assigned material for the student to do their labs on.

STUDENT LEVEL: The student level is the level you have to be at in order to get the course connect interface.

STUDENT RIGHTS: Students can only make reservations for self-paced courses and can transfer them and extend them and cancel them, they also can start a reservation whether is c self-paced or an instructor led TIMESLOT: A period of time that can be allocated to a reservation. In the preferred embodiment, a timeslot corresponds to hours in a day for reservations (e.g., hourly). In some embodiments, up to 23 timeslot (hours) are available per day per reservation.

TESTING: There are four separate testing environments available: 1) server test; 2) performance based testing; 3) multiple choice; 4) problem solving testing.
  1. Server test: VCMDS tests the server setup prior to delivering course (automated).
  2. Performance based testing: a student completes a course. The VCMDS allocates a server and creates a test environment (using the test definition supplied to VCMDS by SME (subject matter expert/course developer)). The student takes the performance based test using the test environment while an instructor monitors and inspects student performance.
  3. Multiple choice: an instructor can supply multiple choice tests to the VCMDS. An instructor can monitor multiple-choice test taking if they so choose.
  4. Problem solving testing: the VCMDS will create the problem solving test environment (using the test definition supplied to VCMDS by an SME (subject matter expert/course developer). The student will resolve the problem (this testing is self-paced by student. However, VCMDS can accommodate an instructor administrate this test in the lab environment.

UPLOAD USERS: This is a way to take a database extract (e.g., in any text file) and load them into the VCMDS system without loading them one by one.

VIRTUAL CLASSROOM: a meeting environment where students and instructors can converse. A virtual classroom is also a shared environment for learning provided via the browser interface. The virtual classroom may include a view of instructor provided video or materials, and a shared window for text based communication. The virtual classroom may also permit voice and/or video communication.

VIRTUAL CLASSROOM SEAT: This is a seat for a Virtual Classroom to collaborate with the instructor and other students.

VIRTUAL LAB: a virtual server allocated to the student (using the definition supplied to VCMDS by the SME) for the student to utilize to complete performance lab objectives. For example, the student may have an assignment to perform a series of tasks using a database application involving building tables, performing searches, or developing efficient queries. In another example scenario, a student may be asked to use a remote mechanical drafting application (e.g., AutoCAD) to design a model of a vehicle part using design features of the drafting application. In other scenarios, a student may be asked to perform tasks such as: adding a user to the windows system, generating a Linux kernel and adding drivers, or configuring a spool printer on a Linux or Windows server. This technique of testing is to reinforce the students' understanding and implementation of the course curriculum.

VIRTUAL SERVER: This is a server that is made up of one host server broken up into Virtual Machines.

VIRTUAL MACHINE: A virtual machine (VM) is a software implementation of a computing environment in which an operating system (OS) or program can be installed and run. The virtual machine typically emulates a physical computing environment, but requests for CPU, memory, hard disk, network and other hardware resources are managed by a virtualization layer which translates these requests to the underlying physical hardware. VMs are created within a virtualization layer, such as a hypervisor or a virtualization platform that runs on top of a client or server operating system. This operating system is known as the host OS. The virtualization layer can be used to create many individual, isolated VM environments.

Data Used By VCMDS

Information that is contained in the VCMDS database:

User Information: The VCMDS stores all users information and tracks the resources of each use, including but not limited to tracking time zones. The VCMDS utilizes this information for all applicable processing. User information includes: USER_ID, USERNAME, PASSWORD, FIRST_NAME, LAST_NAME, KNOWN_AS, EMAIL_ADDRESS, PHONE_NUMBER, MOBILE_NUMBER, ADDRESS_LINE_1, ADDRESS_LINE_2, CITY, STATE, ZIP_CODE, TIME_ZONE, TIME_ZONE_OFFSET, VCMDS includes a launcher program that sorts through reservations, interprets regions and time zones by comparing user locations against Oracle's table of time zones to confirm the proper time zone for each user. The VCMD builds the course in conjunction with the students' location. DEFAULT_ACCESS_ROLE, DESCRIPTION, PASSWORD_EXPIRE_ON, ACCOUNT_LOCK_ON, ACCOUNT_LOCKED, LOGIN_COUNT, LAST_LOGIN_SUCCESS, LOGIN_FAILURES, LAST_LOGIN_FAILURE, LOGIN_FAILURES_TOTAL, PASSWORD_RESET_ON, CREATED_ON, CREATED_BY, LAST_UPDATED_ON, LAST_UPDATED_BY, FIRST_PASSWORD_USED, LAST_BROWSER_AGENT, LAST_IP_ADDRESS, ENABLED Password Policy for Login (applies rules regarding login, errors and tracking): POLICY_ID, MAX_LOGIN_FAILURES, ACCOUNT_PASSWORD_LIFETIME, PASSWORD_LENGTH, PASSWORD_CHANGE_ON_FIRST_LOGIN, REQUIRES_USERS_EXPIRATION_LOCK, MUST_NOT_CONTAIN_USERNAME, MUST_CONTAIN_AT_LEAST_ONE_NUM, MUST_CONTAIN_AT_LEAST_ONE_ALFA, COMPANY_ID, CREATED_ON, CREATED_BY, LAST_UPDATED_ON, LAST_UPDATED_BY.

CSV User Information Uploads (permits VCMDS to upload multiple users with a single click): CSV_ID, FILE_NAME, UPLOAD_TYPE, FILE_CONTENT, MIME_TYPE, CHARACTER_SET, COLUMN_COUNT, CREATED_BY, CREATED_ON, LAST_UPDATED_BY, LAST_UPDATED_ON, FLEX_01, FLEX_02, FLEX_03, FLEX_04, FLEX_05, COMPANY_ID, PROCESSED, PROCESSED_ON, PROCESSED_BY.

Login History (tracks all users login history): LOGIN_ID, USERNAME, PASSWORD, LOGIN_SUCCESS, BROWSER_AGENT, IP_ADDRESS, CREATED_ON, CREATED_BY, LAST_UPDATED_ON, LAST_UPDATED_BY, ID, NEWS_UPDATE, CONTACT_INFORMATION, AUTO_EMAIL_PASSWORD, COMPANY_ID, CREATED_BY, CREATED_ON, LAST_UPDATED_BY, LAST_UPDATED_ON Failed Login Attempts (tracks all users failed attempts and number of password resets) ATTEMPT_ID, IP_ADDRESS, BROWSER_AGENT, EMAIL_ADDRESS, USERNAME, RESET_ID, ERROR_MESSAGE, CREATED_BY, CREATED_ON, LAST_UPDATED_BY, LAST_UPDATED_ON Lost Passwords (tracks all users usage): RESET_ID, USER_ID, REQUEST_IP_ADDRESS, REQUEST_BROWSER_AGENT, EMAIL_ADDRESS, RESET_IP_ADDRESS, RESET_BROWSER_AGENT, PASSWORD_RESET, PASSWORD_RESET_ON, CREATED_BY, CREATED_ON, LAST_UPDATED_BY, LAST_UPDATED_ON.

Lost Passwords Failures (records attempts to receive emails to reset password; security by way of using login profiles confirmation): ATTEMPT_ID, IP_ADDRESS, BROWSER_AGENT, EMAIL_ADDRESS, USERNAME, RESET_ID, ERROR_MESSAGE, CREATED_BY, CREATED_ON, LAST_UPDATED_BY, LAST_UPDATED_ON.

Company Information (stores information; all secure information held for this customer is stored under parent company ID): COMPANY_ID, PARENT_COMPANY_ID, COMPANY_NAME, COMPANY_DESCRIPTION, COMMENTS, ACCOUNT_MANAGER_ID, ACCOUNT_STATUS, END_SERVICE_DATE, ORDER_NUMBER, NUMBER_OF_UNITS_PAID, VIRTUAL_CLASSROOM_ OPTION, COMPANY_PASSWORD_GLOBAL, FIRST_LOGIN_STATUS, THEME_ID, LOGO, CALENDAR_WINDOW, CREATED_ON, CREATED_BY, LAST_UPDATED_ON, LAST_UPDATED_BY.

The VCMDS provider administrator will issue a company ID to allow a full view and internal accounting of customer activity; login information; ip addresses, etc . . . for VOLTS Admin. Usage . . . applicable to the RED titles listed below).

Company Access ID: ACCESS_ID, COMPANY_ID, USER_ID, ROLE_ID, CREATED_ON, CREATED_BY, LAST_UPDATED_ON, LAST_UPDATED_BY Company Access Privilege: ID, ACCESS_ID, PRIVILEGE_ID, CREATED_BY, CREATED_ON, LAST_UPDATED_BY, LAST_UPDATED_ON Company Credits (Units): CREDIT_ID, COMPANY_ID, UNITS, PURCHASE_AMOUNT, PURCHASE_DATE, PURCHASED_BY, NOTES, CREATED_BY, CREATED_ON, ORDER_NUMBER, LAST_UPDATED_BY, LAST_UPDATED_ON, CLASS_RESERVATION_ID, CREDIT_TYPE Company Deductions (Units): DEDUCTION_ID, COMPANY_ID, UNITS, NOTES, CREATED_BY, CREATED_ON, ORDER_NUMBER, LAST_UPDATED_BY, LAST_UPDATED_ON, CLASS_RESERVATION_ID Company Default Privileges: ID, COMPANY_ID, ROLE_ID, PRIVILEGE_ID, CREATED_ON, CREATED_BY, LAST_UPDATED_ON, LAST_UPDATED_BY Company Payments (Services): PAYMENT_ID, SERVICE_ID, MONTH, YEAR, AMOUNT, PAYMENT_METHOD, PAYMENT_DATE, CREATED_BY, CREATED_ON, LAST_UPDATED_BY, LAST_UPDATED_ON, PURCHASE_ORDER, PURCHASE_NOTES Company Units Cost: INTERVAL_ID, COMPANY_ID, WEEKDAY_TIME_FROM, WEEKDAY_TIME_TO, WEEKDAY_UNIT_COST, WEEKEND_FROM, WEEKEND_TO, WEEKEND_UNIT_COST, HOLIDAY_TIME_FROM, HOLIDAY_TIME_TO, HOLIDAY_UNIT_COST, CREATED_BY, CREATED_ON, LAST_UPDATED_BY, LAST_UPDATED_ON Company Purchased Units: PURCHASE_ID, COMPANY_ID, NO_UNITS, UNIT_COST, PURCHASE_COST, DISCOUNT, AUTHORIZED_BY, COMMENTS, CREATED_BY, CREATED_ON, LAST_UPDATED_BY, LAST_UPDATED_ON Company Services Used: ID, COMPANY_ID, SERVICE_ID, SERVICE_START, SERVICE_END, SERVICE_CHARGE, DISCOUNT, CREATED_BY, CREATED_ON, LAST_UPDATED_BY, LAST_UPDATED_ON Company Status: COMPANY_STATUS_ID, COMPANY_STATUS, NOTES, CREATED_BY, CREATED_ON, LAST_UPDATED_BY, LAST_UPDATED_ON Volts Services Offered (additional hourly fee billed services, such as administrative, accounting, development): SERVICE_ID, SERVICE_NAME, SERVICE_DESCRIPTION, SERVICE_BILLING, SERVICE_ENABLED, SERVICE_START_DATE, SERVICE_END_DATE, SERVICE_ CHARGE, CREATED_BY, CREATED_ON, LAST_UPDATED_BY, LAST_UPDATED_ON Course Information: COURSE_ID, PARENT_COURSE_ID, COMPANY_ID, COURSE_NUMBER, COURSE_NAME, COURSE_CATEGORY_ID, COURSE_VERSION, COURSE_SHORT_DESCRIPTION, AVAILABLE_FROM, EXPIRE_ON, COURSE_LONG_DESCRIPTION, COURSE_UNIT_NUMBERS, TYPE_OF_DELIVERY, DOCUMENTATION_URL, DOC_COPYWRIGHT_PRINTED, DOC_COPYWRIGHT_TOTAL, COURSE_TYPE_ID, PERFORMANCE_BASED_TEST, COURSE_DURATION, DEFAULT_START_TIME, DEFAULT_FINISH_TIME, DEFAULT_LASTDAY_START_TIME, DEFAULT_LASTDAY_FINISH_TIME, MAXIMUM_EXTEND_TIME_MINS, CREATED_ON, CREATED_BY, LAST_UPDATED_ON, LAST_UPDATED_BY, BUILD_TIME, DAILY_SCHEDULE_LIMIT, MINIMUM_DAY_HOURS, MAXIMUM_DAY_HOURS Course Documents: DOCUMENT_ID, COURSE_ID, FILE_NAME, FILE_CONTENTS, MIME_TYPE, FILE_SIZE, CREATED_BY, CREATED_ON, LAST_UPDATED_BY, LAST_UPDATED_ON, COPYRIGHT_TRACKING, COPYRIGHT_TOTAL, COPYRIGHT_PRINTED, DESCRIPTION, DISABLE_ALERT Course Document Usage: USAGE_ID, COMPANY_ID, CLASS_RESERVATION_ID, RESERVATION_ID, COURSE_ID, USER_ID, PRINTED_ON, CREATED_BY, CREATED_ON, LAST_UPDATED_BY, LAST_UPDATED_ON, DOCUMENT_ID Course Category: COURSE_CATEGORY_ID, COURSE_CATEGORY, COURSE_CATEGORY_DESCRIPTION, CREATED_BY, CREATED_ON, LAST_UPDATED_BY, LAST_UPDATED_ON, PARENT_COURSE_CATEGORY_ID Course Build Scripts: BUILD_SCRIPT_ID, COURSE_ID, LAUNCH_SCRIPT, DELAY_INTERVAL, SCRIPT_SEQUENCE, CREATED_BY, CREATED_ON, LAST_UPDATED_BY, LAST_UPDATED_ON, SCRIPT_TYPE_ID, COURSE_SERVER_ID Course Build Scripts Types (Pre-Build, Build, Post Build): SCRIPT_TYPE_ID, SCRIPT_TYPE, DISPLAY_SEQUENCE, COMMENTS, CREATED_BY, CREATED_ON, LAST_UPDATED_BY, LAST_UPDATED_ON Course Required Applications: ID, COURSE_ID, APPLICATION_ID, COURSE_SERVER_ID, CREATED_BY, CREATED_ON, LAST_UPDATED_BY, LAST_UPDATED_ON Course Types: COURSE_TYPE_ID, COURSE_TYPE, COMMENTS, CREATED_BY, CREATED_ON, LAST_UPDATED_BY, LAST_UPDATED_ON, COURSE_TYPE_DISP Data used to create, manage and execute the reservation for all courses, regardless of self-paced or instructor led. Reservations: RESERVATION_ID, COMPANY_ID, INSTRUCTOR_ID, COURSE_ID, COURSE_TYPE, COURSE_NUMBER, BUILD_STATUS_ID, BUILD_COUNT, CLASS_RESERVATION_ID, RESERVATION_CLONE, AFTER_SUPPORT_HOURS, WANT_SUPPORT_COVERAGE, CREATED_BY, CREATED_ON, LAST_UPDATED_BY, LAST_UPDATED_ON Reservation Build Information: RESERVATION_BUILD_ID, RESERVATION_DATE_ID, RESERVATION_, SERVER_ID, IS_VIRTUAL_SERVER, RESERVATION_START, RESERVATION_FINISH, BUILD_START, BUILD_FINISH, HOST_IP_ADDRESS, HOST_NAME, LOGIN, PASSWORD, MENU_IP_ADDRESS, BUILD_STATUS, JOB_NAME, STUDENT_BUILDS, NO_SHOW, GROUP_ID, VIRTUAL_CLASSROOM_REQUIRED, CREATED_BY, CREATED_ON, LAST_UPDATED_BY, LAST_UPDATED_ON, CLASS_RESERVATION_ID, CLASS_RES_DATE_ID, COMPANY_ID, COURSE_SERVER_ID, BUILD_COUNT, COURSE_ID, BUILD_EXCEPTION_OCCURRED, PREVIOUS_BUILD_STATUS Reservation Dates Information: RESERVATION_DATE_ID, RESERVATION_ID, COMPANY_ID, RESERVATION_START, RESERVATION_FINISH, BUILD_STATUS, BUILD_COUNT, CREATED_BY, CREATED_ON, LAST_UPDATED_BY, LAST_UPDATED_ON, CLASS_RES_DATE_ID, DAY_NUMBER Reservation Status: DELIVERED, COMPLETED, STUDENT BUILDING, READY, CANCELLED, INCOMPLETE, BUILDING, RESERVED, NO SHOW, FAILED, STUDENT, REBUILDING, REBUILDING, OPEN, REBUILD, ON HOLD, INVALID, MISSING SERVER LICENSE, MISSING OS LICENSE, MISSING APP LICENSE Reservation Students: ID, RESERVATION_ID, STUDENT_ID, CREATED_BY, CREATED_ON, LAST_UPDATED_BY, LAST_UPDATED_ON, STUDENT_NUMBER Class Reservations Only: CLASS_RESERVATION_ID, COMPANY_ID, COURSE_ID, INSTRUCTOR_ID, NO_STUDENTS, NO_STUDENTS_PER_SERVER, VIRTUAL_CLASSROOM_REQUIRED, CREATED_BY, CREATED_ON, LAST_UPDATED_BY, LAST_UPDATED_ON, INSTRUCTOR_NEEDS_SERVER, CLASS_TIME_ZONE, CANCELLED_FLAG, CLASS_TIMEZONE, BUILD_STATUS_ID, UNITS_USED Class Reservation Only Dates: RESERVATION_DATE_ID, COMPANY_ID, CLASS_RESERVATION_ID, RESERVATION_START, RESERVATION_FINISH, CREATED_BY, CREATED_ON, LAST_UPDATED_BY, LAST_UPDATED_ON, DAY_NUMBER, BUILD_STATUS_ID, CLASS_EXTENDED Application Information: APPLICATION_ID, APPLICATION_NAME, APPLICATION_REVISION, NUMBER_LICENSES, INSTALLED_DATE, ASSET_AVAIL_COLUMN_NAME, MEMORY_GIG, COMPANY_ID, CREATED_BY, CREATED_ON, LAST_UPDATED_BY, LAST_UPDATED_ON, ASSET_TRACKING_ON Application Reservation Licenses: LICENSE_ID, LICENSE_NAME, LICENSE_KEY, PURCHASE_DATE, LICENSE_COST, APPLICATION_ID, LICENSE_IN_USE, LICENSE LAST_USE_DATE, CREATED_BY, CREATED_ON, LAST_UPDATED_BY, LAST_UPDATED_ON, SERVER_ID, RESERVATION_BUILD_ID, SERVICE_STATUS, IS_SPARE Application to Operating System Relationship: ID, APPLICATION_ID, OS_ID, QUANTITY, MEMORY_GIG, DISK_SPACE_GIG, CREATED_BY, CREATED_ON, LAST_UPDATED_BY, LAST_UPDATED_ON Operating System Information: ID, SERVER_ID, OS_ID, CREATED_BY, CREATED_ON, LAST_UPDATED_BY, LAST_UPDATED_ON Operating System Reservation Licenses (allows our program to track all applicable licenses): LICENSE_ID, LICENSE_NAME, LICENSE_KEY, PURCHASE_DATE, LICENSE_COST, OS_ID, SERVER_ID, LICENSE IN_USE, LICENSE_LAST_USED, CREATED_BY, CREATED_ON, LAST_UPDATED_BY, LAST_UPDATED_ON, IS_SPARE, RESERVATION_BUILD_ID, SERVICE_STATUS Automated asset tables used in the management of all server functions by way of allowing VCMDS to manage, control and execute (all) server functions; i.e. IP addresses, host name, NIC, ID, data, memory, applications:

Operating System to Server Relationship: ID, SERVER_GROUP_ID, OS_ID, CREATED_BY, CREATED_ON, LAST_UPDATED_BY, LAST_UPDATED_ON Server Information: SERVER_ID, PARENT_SERVER_ID, GROUP_ID, HOST_NAME, VIRTUAL_MEMORY BASED, IS_VIRTUAL_SERVER, VIRTUALIZATION_TYPE_ID, SERVER_IP_ADDRESS, SERVER_IN_USE, START_DATE, FINISH_DATE, MANUFACTURER_ID, PROCESSORS, MEMORY_GIG, NICS, OS_ID, SERVER_LAST_USED_DATE, FAILED_SYSTEM_REPLACEMENT_IP, STATUS, CLASS_RESERVATION_ID, RESERVATION_ID, SERIAL_NUMBER, ASSET_NUMBER, NO_LAUNCH, ENABLED, CREATED_BY, CREATED_ON, LAST_UPDATED_BY, LAST_UPDATED_ON, CLUSTER_ID, RESERVATION_BUILD_ID, IS_SPARE, SERVICE_STATUS Server Group Information: ASSIGNMENT_ID, GROUP_ID, SERVER_ID, CREATED_BY, CREATED_ON, LAST_UPDATED_BY, LAST_UPDATED_ON Server Groups: GROUP_ID, ASSET_AVAIL_COLUMN_NAME, GROUP_DESCRIPTION, ENABLED, GROUP_AVAILABLE_FROM, GROUP_EXPIRATION_DATE, CREATED_BY, CREATED_ON, LAST_UPDATED_BY, LAST_UPDATED_ON Inventory of Servers: MANUFACTURER_ID, MANUFACTURER_NAME, CREATED_BY, CREATED_ON, LAST_UPDATED_BY, LAST_UPDATED_ON E-Mail Log (tracks all emails generated by the VCMDS): EMAIL_LOG_ID, DATE_SENT, EMAIL_TYPE, STATUS, ATTACHMENT, ERROR_MSG, TO_RECIPIENT, CC_RECIPIENT, BCC_RECIPIENT, CREATED_BY, CREATED_ON, LAST_UPDATED_BY, LAST_UPDATED_ON Error Messages from User Interface (VCMDS automatically tracks and records error messages forced by the user interface trapped by the executable programs, and will store this log for our future use and diagnosis): ERROR_CODE, ERROR_TEXT, CREATED_ON, CREATED_BY, LAST_UPDATED_ON, LAST_UPDATED_BY Asset Unavailable Log (when a user attempts to make a reservation and assets are unavailable to complete the reservation, VCMDS will automatically generate an email to VOLTS Admin for resolution and tracking purposes. VCMDS will supply a solution at the time of notice, and will track the Customer ID and reservation number to accommodate customer needs): ID, COURSE_ID, RESERVATION_DATE, ASSET_TABLE_NAME, ASSET_COLUMN_NAME, ASSET_ID, TOTAL_ASSETS, RESERVED_ASSETS, NO_RESERVATIONS, COMPANY_ID, USER_ID, CREATED_BY, CREATED_ON, LAST_UPDATED_BY, LAST_UPDATED_ON, SERVERS_REQUIRED, UNAVAILABLE_COUNT Asset Information: RESERVATION_DATE, TOTAL_VIRTUAL_CLASS_SEATS, RESERVED_VIRTUAL_CLASS_SEATS, TOTAL_SERVER_GROUP 1-30, RESERVED_SERVER_GROUP_1-30, TOTAL_OS_LICENSE_1-15, RESERVED_OS_LICENSE_1-15, TOTAL_APP_LICENSE_1-50, RESERVED_APP_LICENSE_1-50, Virtual Views In database theory, a view is the result set of a stored query—or map-and-reduce functions—on the data, which the database users can query just as they would a persistent database collection object. This pre-established query command is kept in the database dictionary. Unlike ordinary base tables in a relational database, a view does not form part of the physical schema: as a result set, it is a virtual table computed or collated from data in the database, dynamically when access to that view is requested. Changes applied to the data in a relevant underlying table are reflected in the data shown in subsequent invocations of the view. In some NoSQL databases, views are the only way to query data.

Views can provide advantages over tables: views can represent a subset of the data contained in a table; consequently, a view can limit the degree of exposure of the underlying tables to the outer world. a given user may have permission to query the view, while denied access to the rest of the base table.

Views can join and simplify multiple tables into a single virtual table

Views can act as aggregated tables, where the database engine aggregates data (sum, average etc.) and presents the calculated results as part of the data Views can hide the complexity of data; for example a view could appear as Sales2000 or Sales2001, transparently partitioning the actual underlying table Views take very little space to store; the database contains only the definition of a view, not a copy of all the data which it presents. Depending on the SQL engine used, views can provide extra security. Just as a function (in programming) can provide abstraction, so can a database view. In another parallel with functions, database users can manipulate nested views, thus one view can aggregate data from other views. Without the use of views, the normalization of databases above second normal form would become much more difficult. Views can make it easier to create lossless join decomposition.

As disclosed herein, the VCMDS is programmed using a database such as an Oracle database (e.g., a relational or an object-relational database management system), which stores data in tables, creates virtual views (virtual tables) and also stores a set of operating-system processes (instances of computer programming code which is executable and may be executed). VCMDS (the system disclosed herein) carries out management functions (disclosed herein such as scheduling courses, building courses, reserving servers, etc.) and delivery functions (such as enabling users to log into a virtual classroom, take a virtual lab, rebuild a class, rebuild a lab, and other delivery functions disclosed herein). Thus, in VCMDS, the virtual classroom classes are managed and delivered, e.g., scheduled, built, and provided, "inside" or "within" the database. The database is combined with or includes APEX to provide a browser based user interface.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A computer implemented method of an online course, comprising:
    a step of receiving by a processor a server quantity, the server quantity being a number of servers to be loaded with an operating system and a course application to provide a computer-based teaching environment to a student user, wherein the processor operates in connection with a database;
    a step of receiving by the processor a server-student allocation, the server-student allocation being a number that determines a relationship of students in the computer-based teaching environment to the servers providing the computer-based teaching environment;
    a step of determining by the processor a reservation permission for the computer-based teaching environment during a timeslot based on the server quantity, the server-student allocation, and available assets, wherein the available assets includes an unreserved server; and a step of transmitting by the processor, the reservation permission for the computer-based teaching environment during the timeslot.

2. The method of claim 1, wherein the server-student allocation is a quantity of students to be allocated to each server.

3. The method of claim 1, wherein each server is one of a virtual server and a server delivered virtually.

4. The method of claim 1, wherein the reservation permission is further determined based on available assets for an additional non-sequential timeslot for the computer-based teaching environment.

5. The method of claim 1, wherein the computer-based teaching environment is accessible via a standard internet browser, and provides each student user with access to the computer application operating on a corresponding one of the servers.

6. The method of claim 1, further comprising:
a step of providing an indication of an asset limitation during an open timeslot, wherein the asset limitation is a quantity restriction of available additional assets that can be used to provide the computer-based teaching environment.

7. The method of claim 6, wherein the asset limitation is at least one of an additional server, an additional operating system license, an additional application license, a documentation copyright license, and a virtual classroom seat.

8. The method of claim 6, wherein the indication includes the quantity of available additional assets.

9. The method of claim 1, wherein the server type is at least one of a server for supporting multiple server groups, and a stand alone server.

10. The method of claim 1, wherein the database is one of a relational database and an object-oriented relational database management system and wherein in the step of receiving a server quantity, the received server quantity is compared with an asset limitation in an asset table in the database using operating-system processes stored in the database and the received server quantity is stored in the database if within the asset limitation, in the step of receiving a server-student allocation, the received server-student allocation is compared with an asset limitation in an asset table in the database using operating-system processes stored in the database and the received server-student allocation is stored in the database if within the asset limitation, and in the step of determining a reservation permission, a timeslot selection is received and compared with available timeslots and reservation permission is granted and stored in the database if the timeslot is within the available timeslots, and storing the reservation permission within the database, and wherein there is also a step of delivering the online course using information stored in the database.

11. A non-transitory computer readable storage medium having a database and storing one or more programs, the database and one or more programs storing instructions, which when executed by an electronic device, cause the device to:
implement a step of receiving, by a processor, a server quantity the server quantity being a number of servers to be loaded with an operating system and a course application to provide a computer-based teaching environment to a student user, wherein the processor operates within a database;
implement a step of receiving a server-student allocation, the server-student allocation being a number that determines the proportion of students in the computer-based teaching environment to the servers providing the computer-based teaching environment;
implement a step of determining a reservation permission for the computer-based teaching environment during a timeslot based on the server quantity, the server-student allocation, and available assets, wherein the available assets includes an unreserved server; and
implement a step of providing, by the processor, the reservation permission for the computer-based teaching environment during the timeslot.

12. The non-transitory computer readable storage medium of claim 11, wherein the server-student allocation is a quantity of students to be allocated to each server.

13. The non-transitory readable storage medium of claim 11, wherein each server is one of a virtual server and a server delivered virtually.

14. The non-transitory computer readable storage medium of claim 11, wherein the timeslot is defined by reservation permission and is further determined based on available assets for an additional non-sequential timeslot for the computer-based teaching environment.

15. The non-transitory computer readable storage medium of claim 11, wherein the computer-based teaching environment is accessible via a standard internet browser, and provides each student user with access to the computer application operating on a corresponding one of the servers.

16. The non-transitory computer readable storage medium of claim 11, wherein a device may be further caused to:
implement a step of providing an indication of an asset limitation during an open timeslot, wherein the asset limitation is a quantity restriction of available additional assets that can be used to provide the computer-based teaching environment.

17. The non-transitory computer readable storage medium of claim 16, wherein the asset limitation is at least one of an additional server, an additional operating system license, an additional application license, a documentation copyright license, and a virtual classroom seat.

18. The non-transitory computer readable storage medium of claim 11, wherein the database is one of a relational database and an object-oriented relational database management system and wherein in the step of receiving a server quantity, the received server quantity is compared with an asset limitation in an asset table in the database using operating-system processes stored in the database and the received server quantity is stored in the database if within the asset limitation, in the step of receiving a server-student allocation, the received server-student allocation is compared with an asset limitation in an asset table in the database using operating-system processes stored in the database and the received server-student allocation is stored in the database if within the asset limitation, and in implementing a step of determining a reservation permission, a timeslot selection is received and compared with available timeslots and reservation permission is granted and stored in the database if the timeslot is within the available timeslots, and storing the reservation permission within the database, and wherein the device may be further caused to implement a step of delivering the online course using information stored in the database.

19. A computer implemented method of an online course, comprising:
a step of receiving a server quantity, by a processor, the server quantity being a number of servers to be loaded with an operating system and a course application to provide a computer-based teaching environment to a student user, wherein the browser interface operates within a database;

a step of receiving a server-student allocation, by a processor, the server-student allocation being a number that determines the proportion of students in the computer-based teaching environment to the servers providing the computer-based teaching environment;

a step of determining a reservation permission for the computer-based teaching environment during a timeslot based on the server quantity, the server-student allocation, and available assets, wherein the available assets includes an unreserved server;

a step of providing, by a processor, the reservation permission for the computer-based teaching environment during the timeslot;

a step of determining a course price as a function of the number of servers to be used to provide the computer-based teaching environment; and a step of providing an indication of an asset limitation during an open timeslot, wherein the asset limitation is a quantity restriction of available additional assets that can be used to provide the computer-based teaching environment.

20. The method of claim 19, wherein the database is one of a relational database and an object-oriented relational database management system and wherein in the step of receiving a server quantity, the received server quantity is compared with an asset limitation in an asset table in the database using operating-system processes stored in the database and the received server quantity is stored in the database if within the asset limitation, in the step of receiving a server-student allocation, the received server-student allocation is compared with an asset limitation in an asset table in the database using operating-system processes stored in the database and the received server-student allocation is stored in the database if within the asset limitation, and in the step of determining a reservation permission, a timeslot selection is received and compared with available timeslots and reservation permission is granted and stored in the database if the timeslot is within the available timeslots, and storing the reservation permission within the database, and wherein there is also a step of delivering the online course using information stored in the database.

* * * * *